United States Patent [19]
Lu et al.

[11] Patent Number: 5,842,138
[45] Date of Patent: Nov. 24, 1998

[54] CONFIGURATION-INDEPENDENT METHODS AND APPARATUS FOR SOFTWARE COMMUNICATION IN A CELLULAR NETWORK

[75] Inventors: Priscilla Marilyn Lu, San Carlos; Timothy Richard White, Palo Alto, both of Calif.

[73] Assignee: interWAVE Communications International Ltd., Bermuda

[21] Appl. No.: 730,652

[22] Filed: Oct. 11, 1996

Related U.S. Application Data

[63] Continuation-in-part of Ser. No. 435,709, May 4, 1995, Pat. No. 5,734,699.

[51] Int. Cl.$^6$ .................................................. H04Q 7/22
[52] U.S. Cl. ........................ 455/560; 455/403; 455/418; 455/422
[58] Field of Search .................................... 455/403, 405, 455/418, 419, 420, 424, 560, 561, 422; 370/328, 329, 336, 337, 362; 395/680, 682, 280, 284, 285, 286, 308, 309

[56] References Cited

U.S. PATENT DOCUMENTS

| | | | |
|---|---|---|---|
| 4,726,014 | 2/1988 | Goldman et al. | 370/58 |
| 5,157,709 | 10/1992 | Ohteru | 379/58 |
| 5,195,090 | 3/1993 | Bolliger et al. | 455/560 |
| 5,386,466 | 1/1995 | Bales et al. | 379/220 |
| 5,408,419 | 4/1995 | Wong | 455/560 |
| 5,418,838 | 5/1995 | Havermans et al. | 455/560 |
| 5,442,633 | 8/1995 | Perkins et al. | 370/94.1 |
| 5,479,483 | 12/1995 | Furuya et al. | 379/60 |
| 5,504,804 | 4/1996 | Widmark et al. | 379/63 |
| 5,506,837 | 4/1996 | Söllner et al. | 370/31 |
| 5,506,887 | 4/1996 | Emery et al. | 379/58 |

(List continued on next page.)

FOREIGN PATENT DOCUMENTS

| | | | |
|---|---|---|---|
| 462 727 A2 | 12/1991 | European Pat. Off. | H04Q 7/04 |
| 462 728 A2 | 12/1991 | European Pat. Off. | H04Q 7/04 |
| 566 407 A2 | 10/1993 | European Pat. Off. | H04Q 7/04 |
| 587 211 A2 | 3/1994 | European Pat. Off. | H04Q 7/04 |
| 595 392 A1 | 4/1994 | European Pat. Off. | H04Q 7/04 |
| 605 086 A1 | 6/1994 | European Pat. Off. | H04Q 7/04 |
| 605 311 A1 | 6/1994 | European Pat. Off. | H04B 7/26 |
| 600 681 A1 | 8/1994 | European Pat. Off. | H04Q 7/26 |
| WO 93/11625 | 10/1993 | WIPO | H94M 11/00 |
| WO 94/05126 | 3/1994 | WIPO | H04Q 7/04 |
| WO 94/26073 | 11/1994 | WIPO | H04Q 7/04 |
| WO 95/24789 | 9/1995 | WIPO . | |

OTHER PUBLICATIONS

J.B. Hollis, "Air Interface, Protocols for a National Mobile Data Network," IEE Collq. (1993) No. 003: Cordless Computing–Systems and User Experience, pp. 1–5.

*Primary Examiner*—Curtis A. Kuntz
*Assistant Examiner*—Binh K. Tieu
*Attorney, Agent, or Firm*—Beyer & Weaver, LLP

[57] ABSTRACT

A configuration-independent software architecture for implementing a cellular communication network that facilitates communication among a plurality of cellular handsets. The architecture includes a first software functional block for implementing a first set of functions and a second software functional block for implementing a second set of functions. The architecture further includes a configuration-independent linkage block, which has an interface that appears consistent to both the first software functional block and the second software functional block irrespective of a relative position between the second software functional block, the first software functional block, and the configuration-independent linkage block in the cellular communication network. The configuration-independent linkage block facilitates communication between the first software functional block and the second software functional block via the interface utilizing configuration-independent linkage block. Advantageously, the first software functional block, the second software functional block, and the interface remain substantially unchanged when the first software functional block changes its location in the cellular communication network relative to the second software functional block.

23 Claims, 11 Drawing Sheets

U.S. PATENT DOCUMENTS

| | | | |
|---|---|---|---|
| 5,512,884 | 4/1996 | Hesse et al. | 340/825.03 |
| 5,526,397 | 6/1996 | Lohman | 455/560 |
| 5,528,664 | 6/1996 | Slekys et al. | 379/58 |
| 5,528,668 | 6/1996 | Aihara | 379/60 |
| 5,577,031 | 11/1996 | Smith | 370/58.1 |
| 5,598,458 | 1/1997 | Bales et al. | 455/418 |
| 5,610,974 | 3/1997 | Lantto | 455/423 |
| 5,666,399 | 9/1997 | Bales et al. | 455/419 |

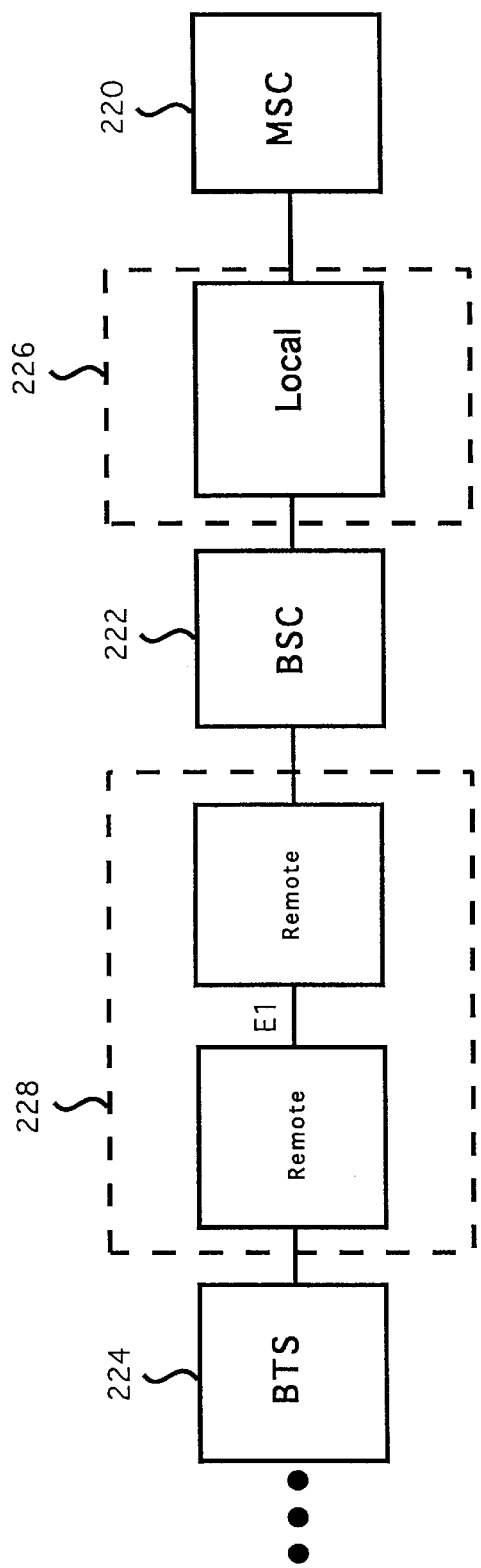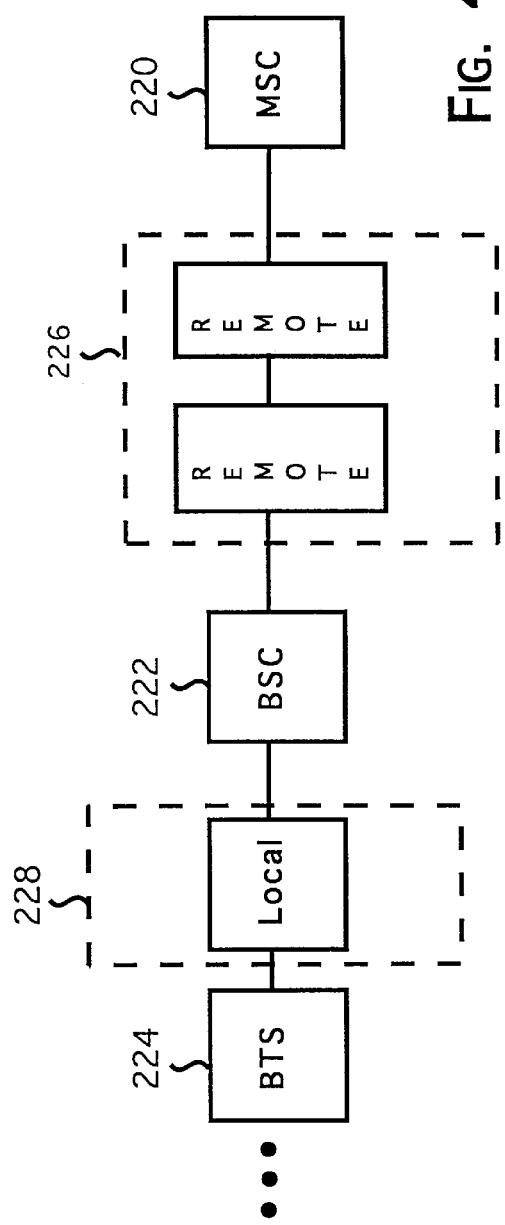
Fig. 4(a)
Fig. 4(b)

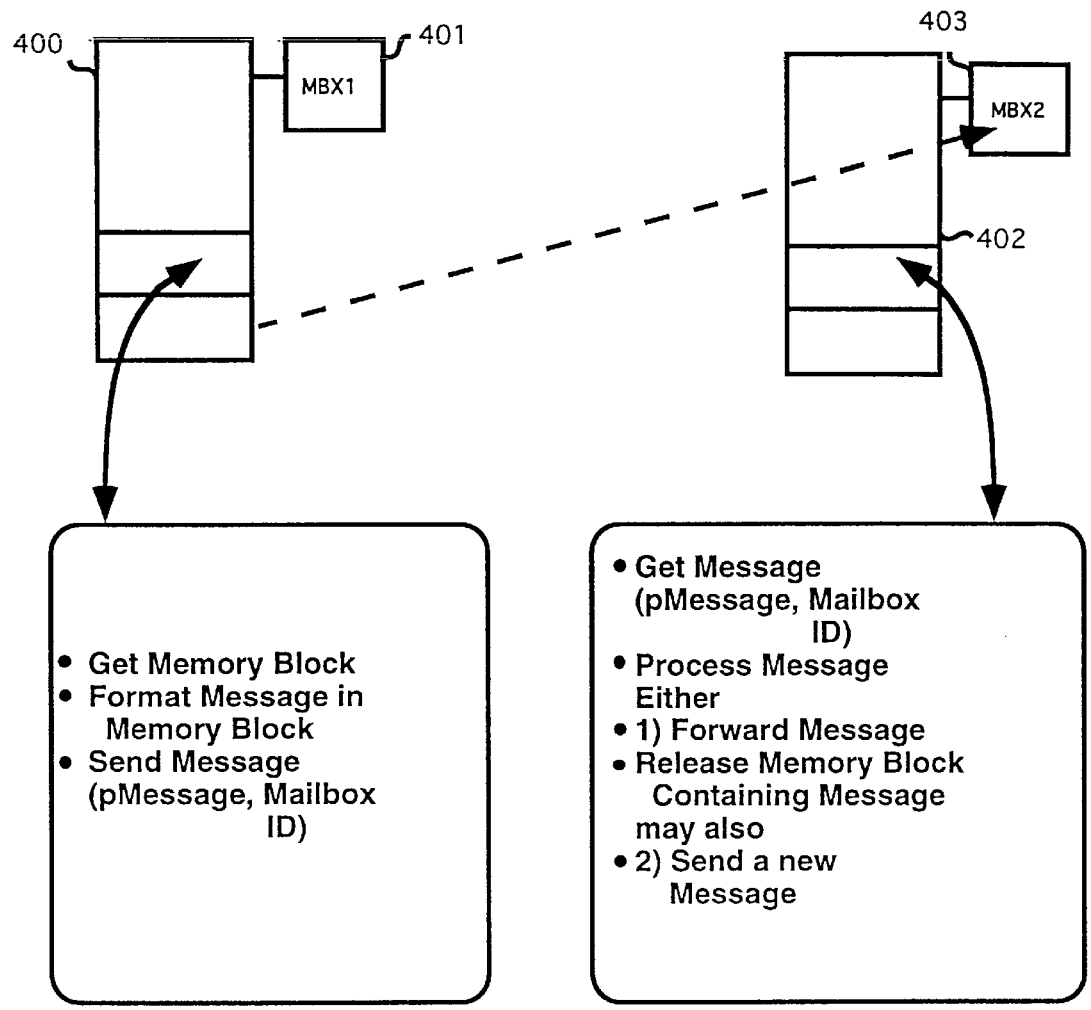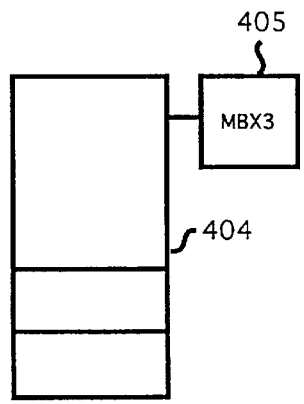
FIG. 7

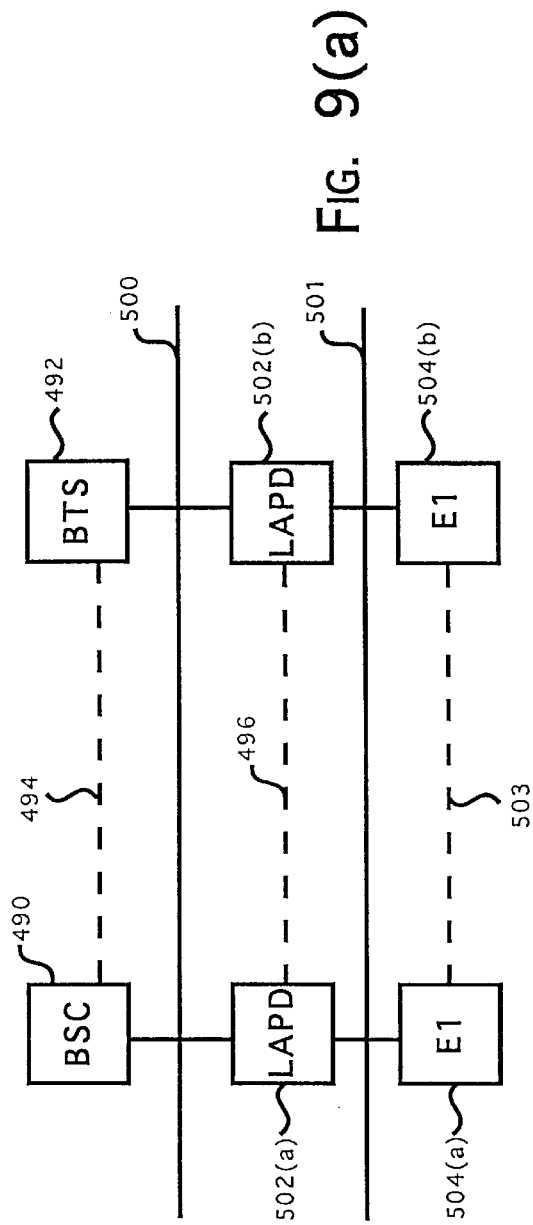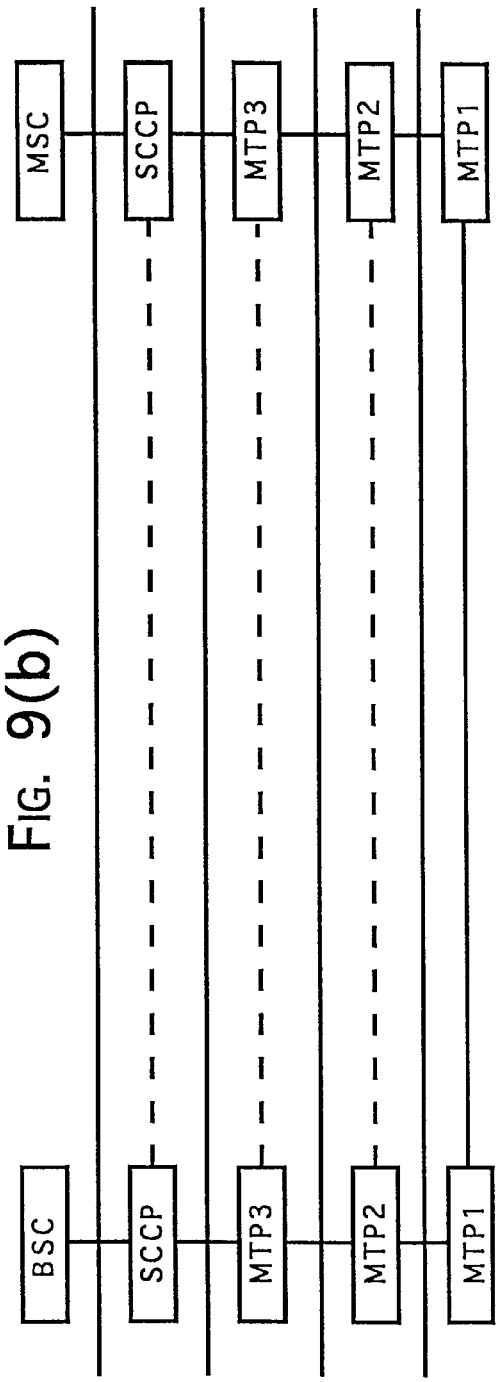

10

CONFIGURATION-INDEPENDENT METHODS AND APPARATUS FOR SOFTWARE COMMUNICATION IN A CELLULAR NETWORK

BACKGROUND OF THE INVENTION

This is a continuation-in-part of commonly assigned U.S. patent Ser. No. 08/435,709, entitled "Cellular Private Branch Exchange," (Attorney's Docket No. WAVEP001), filed May 4, 1995 U.S. Pat. No. 5,734,699 (hereinafter Ser. No. 08/435,709).

The following U.S. patent applications are incorporated herein by reference for all purposes:

"Cellular Private Branch Exchange," (Attorney's Docket No. WAVEP001) filed May 4, 1995 and issued as U.S. Pat. No. 5,734,699 (hereinafter Ser. No. 08/435,709).

"Cellular Communication Network Having Intelligent Switching Nodes," (title as amended) filed May 4, 1995, U.S. Ser. No. 08/435,838, and issued as U.S. Pat. No. 5,577,029 Attorney's Docket No. WAVEP004 (hereinafter "Ser. No. 08/435,838").

"Hybrid Cellular Communication Apparatus And Method," filed on even date, U.S. Ser. No. (08/729,546), Attorney's Docket No. WAVEP003 (hereinafter "WAVEP003") and the earlier filed provisional application entitled "Hybrid Cellular Communication Apparatus And Method" filed Nov. 10, 1995 application Ser. No. 60/006,589 by inventors Priscilla Marilyn Lu and Timothy Richard White from which that application claims priority under 35 U.S.C. 119(e).

"Spread Spectrum Communication Network Signal Processor," filed on May 4, 1995, Ser. No. 08/434,554, and issued as U.S. Pat. No. 5,682,403 Attorney's Docket No: A-60910 (hereinafter Ser. No. 08/434,554).

"Cellular Base Station With Intelligent Call Routing," filed on May 4, 1995, Ser. No. 08/434,598, and issued as U.S. Pat. No. 5,734,979 Attorney's Docket No: A-61115 (hereinafter Ser. No. 08/434,598).

"Spectrum Communication Network With Adaptive Frequency Agility," filed on May 4, 1995, Ser. No. 08/434,597, Attorney's Docket No: A-60820 (hereinafter Ser. No. 08/434,597).

For ease of reference, a glossary of terms and abbreviations is provided herewith as Appendix A.

BACKGROUND OF THE INVENTION

The present invention relates to networks for cellular communication service. More specifically, the invention relates to methods and apparatus for implementing software in a cellular network.

FIG. 1 is a diagram illustrating the components of a representative cellular network, including a Mobile Switching Center (MSC) 100, a Base Station Controller (BSC) 102, a Base Transceiver Station (BTS) 104, and a plurality of cellular handsets 106(a)–106(b). The components of the representative cellular network of FIG. 1 has been discussed extensively in the aforementioned patent applications.

In the prior art, each component of the cellular network, i.e., MSC 100, BSC 102, and BTS 104, is implemented on a discrete chassis and housed in a discrete "box." The boxes themselves are then dispersed as required in a geographic location, coupled together by trunk lines to complete the cellular network.

Present implementation of each of MSC 100, BSC 102, and BTS 104 typically includes two main parts: hardware and software. Hardware generally includes the relatively fixed physical circuitries while software, being programmable, is generally easier than hardware to design, implement, and modify. Consequently, while a certain amount of hardware is necessary, it is generally considered desirable to implement as much of the functionalities of the cellular network in software as possible. This is particularly true in view of the availability of modern high speed processors and programmable circuitries.

On one level, it is possible to discuss the implementation and operation of the components of a representative cellular network in terms of its software. By way of example, FIG. 2 is a diagram illustrating a prior art implementation of the software functional blocks for implementing components of the prior art cellular network. Referring now to FIG. 2, there are shown three boxes: 200, 202, and 204, which contain the hardware necessary for implementing respectively the MSC, the BSC, and the BTS components. As shown in FIG. 2, there is also provided in box 200 the software for implementing the MSC function, the A interface necessary for communicating with the software implementing the BSC in box 202, and E1 resources to communicate therewith across trunk line 206. In addition to the requisite hardware, box 202 contains the software for implementing the BSC function, the A interface to communicate with the software implementing the MSC in unit 200, and E1 resources for communicating therewith across trunk line 206. To communicate with software implementing the BTS in box 204, there is further provided in box 202 software for implementing the Abis interface and E1 resources for communicating across a trunk line 208.

In a similar manner, box 204 contains the software for implementing the BTS function, the Abis interface for communicating with the software implementing the BSC in unit 202, and E1 resources to facilitate the communication therewith. To communicate with its handsets (not shown), box 204 further includes the software for implementing the LAPDm facility 212, which in cooperation with software implementing TRX resources 214, permits the software implementing the BTS function in block 204 to communicate with its cellular handsets.

In the prior art each of the software implementing boxes 200, 202, and 204 is customized for a particular cellular network configuration. As the term is used herein, cellular network configuration refers to the MSC's, BSC's, and BTS's in a cellular network, as well as the particular manner in which they are combined, either in one chassis or across multiple chassis. When cellular network configuration changes in the prior art, for example by adding or removing BSC's or BTS's to satisfy domain and capacity requirements, the affected software must be recoded to account for the changes.

By way of example, when a BTS is added to the domain of a BSC and needs to communicate with that BSC, the prior art software implementing the BSC must typically be recoded to account for this change. As another example, if it is decided to collapse the BSC and BTS functions of FIG. 2 into one chassis, say to provide a smaller package to reduce hardware costs and to simplify maintenance and/or upgrade, it is necessary in the prior art to recode both the software implementing the BSC and the software implementing the BTS to account for the fact that these two components no longer need to employ trunk resources for communicating with each other (since they now reside within the same chassis).

Alternatively, if a cellular network is initially configured as a single chassis in which the MSC, the BSC, and the BTS co-reside (as was disclosed in one embodiment of co-pending patent application Ser. No. 08/435,709, and additional remote BTS's are added to the network to expand cellular network capacity at a later date, the prior art method of implementing its software typically requires substantial recoding of the software of the affected components, which may include the MSC, the BSC and the BTS.

Further, the prior art paradigm of implementing the software of the MSC, the BSC, and the BTS of the cellular network requires extensive knowledge regarding how data must be routed in a particular network configuration on the part of the application developer, i.e., those who develop the software that implements the software functional blocks such as the MSC, the BSC, or the BTS. The fact that the software functional blocks of the prior art must be changed to accommodate modifications to the network configuration means that relatively substantial expenditures, both in term of time and expenses, are required when the cellular network is upgraded, or scaled up or down responsive to changes in domain and capacity requirements.

In view of the above, what is desired is an improved method and apparatus for implementing the software of a cellular network in a manner that is as independent of cellular network configuration as possible. It is also desired that the improved method and apparatus implements the MSC, the BSC, and the BTS as substantially unchanging blocks of code irrespective of cellular network configuration. More importantly, it is desired that these substantially unchanging blocks of code, which implement the MSC, the BSC, and the BTS of the cellular network, communicate among themselves using an interface that is also substantially unchanged irrespective of changes in the configuration of the cellular network.

SUMMARY OF THE INVENTION

The present invention relates in one embodiment, to a configuration-independent software architecture for implementing a cellular communication network that facilitates communication among a plurality of cellular handsets.

The architecture includes a first software functional block for implementing a first set of functions and a second software functional block for implementing a second set of functions. The architecture further includes a configuration-independent linkage block, which has an interface that appears consistent to both the first software functional block and the second software functional block irrespective of a relative position between the second software functional block, the first software functional block, and the configuration-independent linkage block in the cellular communication network.

The configuration-independent linkage block facilitates communication between the first software functional block and the second software functional block via the interface utilizing configuration-independent linkage block. Advantageously, the first software functional block, the second software functional block, and the interface remain substantially unchanged when the first software functional block changes its location in the cellular communication network relative to the second software functional block.

In one specific embodiment, the first software functional block is a base transceiver station software functional block and the first set of functions is a set of base transceiver station functions, while the second software functional block is a base station controller software functional block and the second set of functions is a set of base station controller functions.

In yet another embodiment, the invention relates to a method for facilitating communication among a plurality of software functional blocks in a cellular communication network which has a plurality of central processing units. The method includes the step of providing a first software functional block for implementing a first set of functions. The first software functional block is executed on a first central processing unit in the cellular communication network. The method further includes the step of providing a second software functional block for implementing a second set of functions. The second software functional block represents a first instantiation of a block of codes representing the second set of functions.

The inventive method further includes the step of providing a third software functional block for implementing the second set of functions. This third software functional block represents a second instantiation of the block of codes representing the second set of functions. Furthermore, the inventive method includes the step of facilitating configuration-independent communication between the first software functional block and both the second and third software functional blocks using at least one configuration-independent linkage block. In accordance with one aspect of the invention, the configuration-independent linkage block has internal functions that transparently implements, from the perspectives of the first, second, and third software functional blocks, configuration-specific communication among the first, second, and third software functional blocks. The configuration-independent communication takes place via an interface that is substantially consistent irrespective whether the second and third software functional blocks execute on the first central processing unit or on different central processing units in the cellular communication network. Irrespective of this, the first, second, and third software functional blocks remain substantially unchanged across network configurations.

In yet another embodiment, the first, second, and third software functional blocks and the interface remain substantially unchanged irrespective whether the second and third software functional blocks are executed on a second central processing unit that is different from the first central processing unit or on two different central processing units that are different from the first central processing unit.

BRIEF DESCRIPTION OF DRAWINGS

Additional advantages of the invention will become apparent upon reading the following detailed description and upon reference to the drawings, in which:

FIG. 4A illustrates an example of a cellular network configuration wherein the base station controller (BSC) and the mobile station controller (MSC) SFB's co-reside on a single central processing unit (CPU) in a single chassis while the base transceiver station (BTS) software functional block is remoted in a different CPU on a different chassis;

FIG. 4B illustrates an example of a cellular network configuration in which the BSC software functional block and the BTS software functional block co-reside on a single chassis while the MSC SFB is remoted on a different chassis;

FIG. 7 is a diagram illustrating, in one embodiment, a message passing paradigm for facilitating communication between SFB's in a configuration-independent manner;

FIG. 9A shows, in one embodiment, a multiple-layer communication stack for communicating among SFB's;

FIG. 9B shows the communication, using the inventive configuration independent architecture technique, between a BSC SFB and an MSC SFB;

DESCRIPTION OF THE PREFERRED EMBODIMENT

Figure 1:
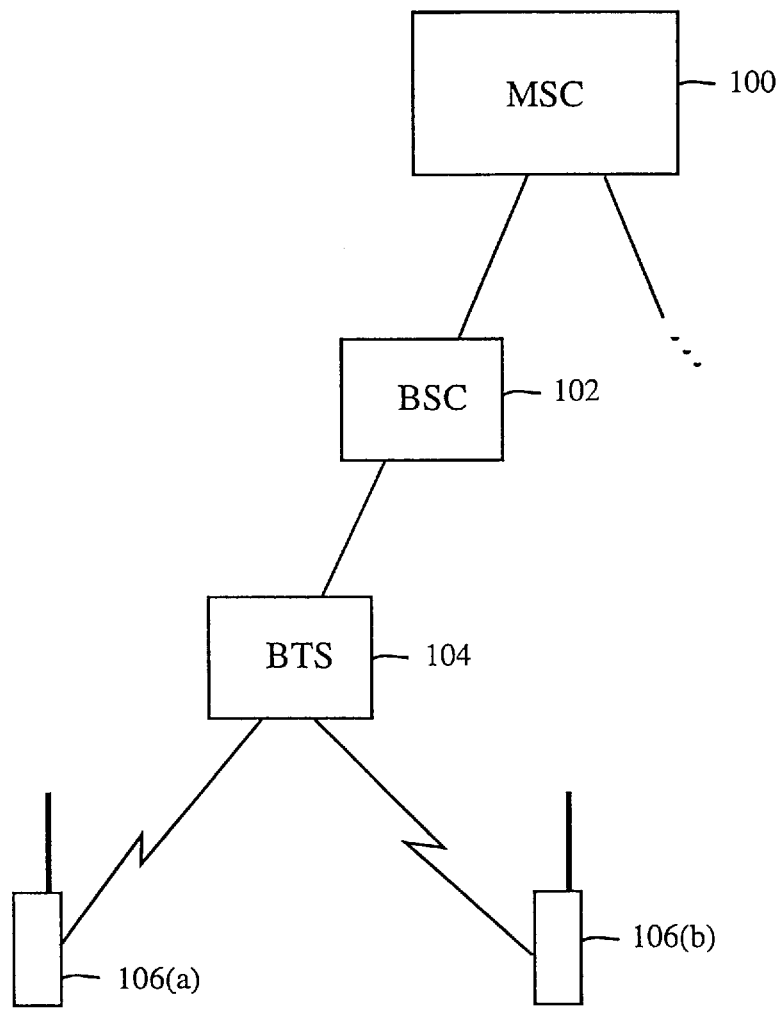
FIG. 1 is a diagram illustrating the components of a representative cellular network.
Figure 2:
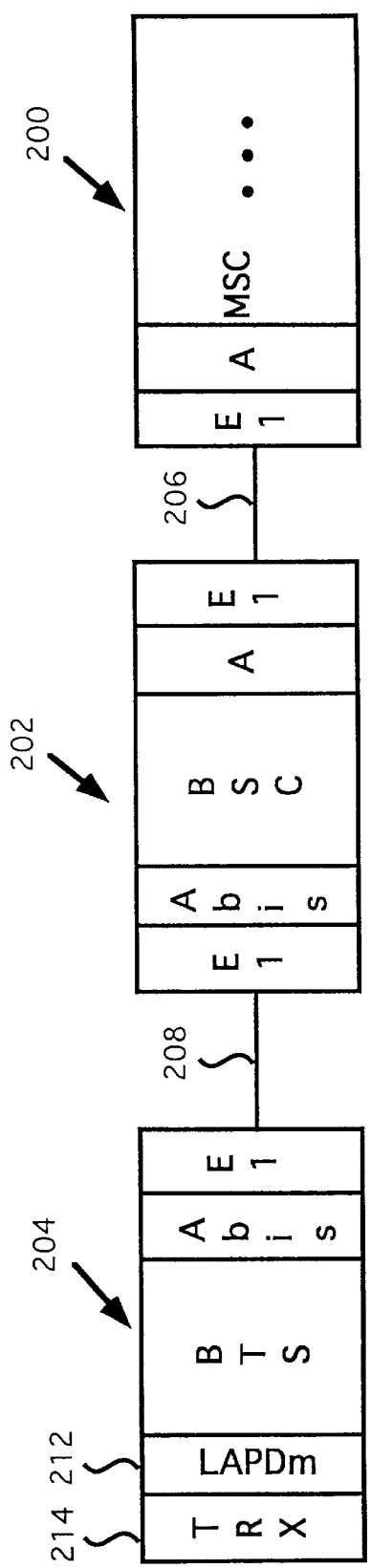
FIG. 2 is a diagram illustrating a prior art implementation of the software functional blocks for implementing components of the prior art cellular network.
Figure 3:
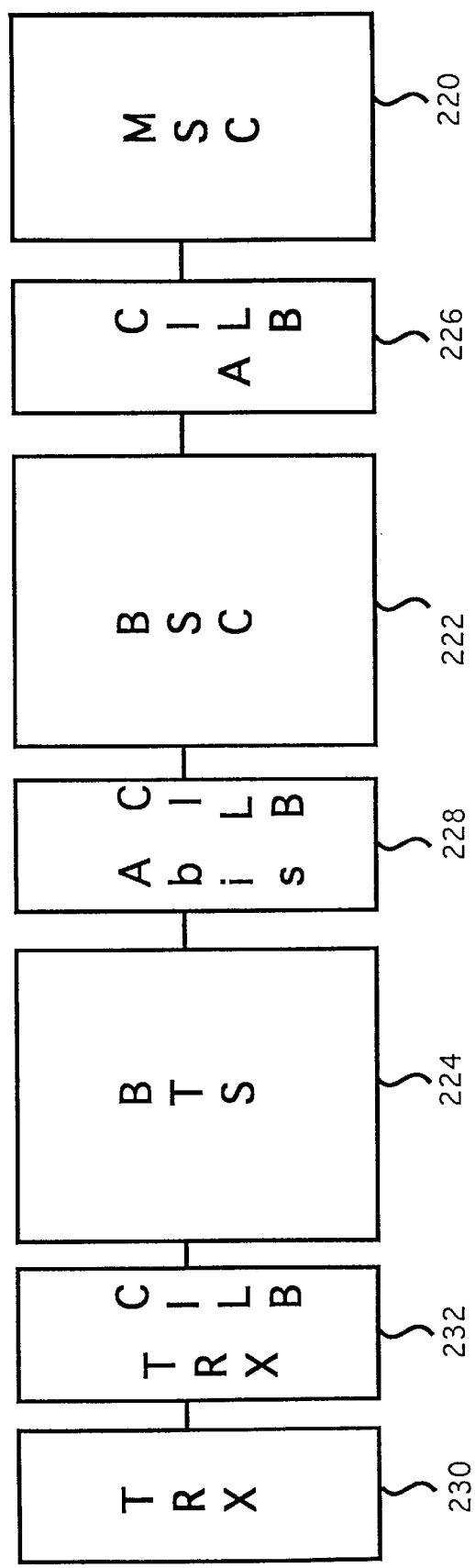
FIG. 3 illustrates, in one aspect of the present invention, the configuration-independent architecture of the software functional blocks (SFB's), which implement the components of the cellular network.

FIG. 3 illustrates, in one aspect of the present invention, the configuration-independent architecture of the software functional blocks (SFB's), which implement the components of the cellular network. In FIG. 3, the three SFB's MSC 220, BSC 222, and BTS 224 are coupled together via configuration-independent linkage blocks (CILB) 226 and 228. In accordance with one aspect of the invention and as will be discussed in detail later, CILB 226 includes an interface that appears substantially unchanged to both MSC SFB 220 and BSC SFB 222 irrespective of the configuration of the cellular network. In other words, the manner in which MSC SFB 220 and BSC SFB 222 communicate with CILB 226 remains substantially unchanged irrespective of whether these two SFB's are executed in the same central processing unit (CPU), implemented in the same physical chassis (i.e., on the same chassis) but executed on different CPU's, or remoted in geographically dispersed chassis that are linked together via trunk lines.

To clarify, when two SFB's are referred to herein as being implemented on the same CPU/chassis, these two SFB's may be executing on the same CPU in that chassis or in multiple CPU's in that same chassis. When multiple CPU's are provided in a single chassis, greater processing power can be provided on that chassis. Multiple CPU's may be tightly coupled, i.e., sharing memory resources and other resources, or loosely coupled, i.e., utilizing the same bus although each CPU is provided with its own memory and other resources. In contrast, when two SFB's are remoted from one another, they are executed on different CPU's in different chassis, and communication between these SFB's requires remote communication resources, e.g., E1.

Further, it is preferable that the interface between CILB 228 and BSC SFB 222 (as well as between CILB 228 and BTS SFB 224) remains substantially unchanged irrespective of cellular network configuration.

In accordance with another aspect of the invention, the software codes that implement these major SFB's, e.g., MSC SFB 220, BSC SFB 222, BTS SFB 224, and radio-dependent SFB's (e.g., TRX SFB 230) stay substantially unchanged irrespective of cellular network configuration. In this manner, each block of codes for implementing the cellular network components may be made modular, thereby simplifying network expansion, upgrade, and maintenance.

In one aspect of the present invention, the major SFB's for implementing the cellular network components may flexibly be combined, either in a single CPU/chassis or be remoted among combinations of CPU/chassis, thereby making it possible to offer custom solutions to fit particular geographic or capacity requirements in a low-cost manner. Because the major SFB's can be recombined among different CPU's/chassis in a manner so as not to require substantial recoding of the major SFB's, this aspect of the present invention advantageously simplifies network upgrade and scaling, i.e., expanding and contracting by respectively adding or removing network components to suit the changing domain or capacity requirements of a cellular network.

In a new market, the inventive configuration-independent architecture allows a cellular provider to offer a cellular network that is less expensive and possesses higher performance characteristics than possible in the prior art by using a single chassis to implement all four major components (i.e., MSC, BSC, BTS, and TRX). By way of example, the use of a single chassis to implement all these four major components advantageously eliminates the costs, in terms of hardware and software, associated with implementing trunk resources. When capacity and domain requirements increase, e.g., to handle more cellular handsets or to expand the area of coverage, the inventive configuration-independent architecture permits scaling of the network software in a modular and configuration-independent manner. Since the major SFB's remain substantially unchanged, and the manner in which they communicate with one another is not dependent on system configuration, network upgrade and expansion are substantially simplified.

In accordance with this aspect of the invention, changes in cellular network configuration impact primarily only the software functions that underlie the CILB's. By way of example, when a cellular network configuration changes from a BTS/BSC configuration (both the BTS and the BSC co-reside on the same CPU/chassis and the MSC is remoted) to a BTS/BSC/MSC configuration (all three SFB's co-reside on the same CPU/chassis), it is the software functions implementing the CILB's between the SFB's, not the SFB's themselves, that change. However, the CILB interfaces through which these major SFB's communicate preferably stays substantially unchanged from the perspectives of the SFB's that implement the MSC, the BSC, and the BTS.

BTS SFB 224 also communicates with TRX SFB 230 via TRX configuration-independent linkage block (CILB) 232, which possesses an interface that appears substantially unchanged to both BTS SFB 224 and TRX SFB 230 irrespective of cellular network configuration, i.e., regardless whether they co-reside in the same CPU/chassis or are remoted among different CPU's/chassis. As is apparent in the above example, the term software functional block is not restricted only to blocks of codes that implement the MSC, the BSC, and the BTS. In fact, they apply to any executable block of codes that performs a particular task in the cellular network and which is substantially immune to changes in network configuration.

FIG. 4A illustrates an example of a cellular network configuration wherein the BSC and the MSC SFB's co-reside on a single CPU in a single chassis while the BTS SFB is remoted in a different CPU on a different chassis. In FIG. 4A, MSC SFB 220 communicates with BSC SFB 222 via CILB 226 while BSC SFB 222 communicates with BTS SFB 224 via CILB 228. In the specific example of FIG. 4A, the GSM standard is chosen for illustration purposes although it should be understood that the present inventive configuration-independent architecture is not limited to any particular protocol. By way of example, it is contemplated that the inventive configuration-independent architecture may be implemented using a local area network protocol, such as TCP/IP, or other cellular standards such as AMPS (Advanced Mobile Phone Services), TACS, and the like.

Since BSC SFB 222 and MSC SFB 220 co-reside in the same CPU, CILB 226 is implemented as a local interface, and more particularly, a local interface implementing the GSM-related A interface that utilizes message passing for communication. The A interface implemented in the network of FIG. 4A follows, in one embodiment, the Signaling Connection Control Part-Message Transfer Part 1-3 (SCCP MTP1-3) as described in the GSM specification 08.06. Message passing will be explained later in connection with FIG. 7. Further, since BTS SFB 224 is remoted from either BSC SFB 222 or MSC SFB 220, CILB 228 is implemented as a remote interface. In the specific example of FIG. 4A, CILB 228 is implemented as a remote interface utilizing the GSM-related Abis interface, which utilizes E1 trunk facilities and trunk lines to facilitate remote communication.

Most importantly, MSC SFB 220, BSC SFB 222, and BTS SFB 224 stay substantially unchanged irrespective whether they all co-reside in the same CPU/chassis or are remoted in different CPU's/chassis. Furthermore, the interfaces of CILB 226 and CILB 228, as well as all CILB's implemented in accordance with the technique disclosed herein, appears substantially unchanged to the SFB's with which they communicate. For example, CILB 226 has an interface that appears substantially unchanged to MSC SFB 220 and BSC SFB 222 regardless whether CILB 226 is implemented as a local interface (as in the example of FIG. 4(a)) or as one that facilitates remote communication between SFB's that are remoted in different CPU's/chassis (as in the case where BSC SFB 222 is remoted from MSC SFB 220 in different CPU's/chassis). Likewise, CILB 228 has an interface that appears substantially unchanged to BSC SFB 222 and BTS SFB 224 regardless whether CILB 228 is internally implemented as a local interface or as one that facilitates remote communication.

For comparison purpose, FIG. 4B shows a cellular network configuration in which BSC SFB 222 and BTS SFB 224 co-reside on a single chassis while MSC SFB 220 is remoted on a different chassis. As in the cases of FIGS. 3 and 4A, the SFB's communicate using their respective CILB's which have consistent interfaces irrespective whether they co-reside on the same chassis or are remoted from one another. Further, there are substantially no differences between the BTS, BSC, and MSC SFB's of FIG. 3, and respective SFB's of FIG. 4A and FIG. 4B. The fact that the CILB 228 implements the GSM-related Abis interface in a local manner in FIG. 4B and in a remote manner in FIG. 4A is largely hidden from BSC SFB 222 and BTS SFB 224 by the configuration-independent interface of CILB 228. Likewise, the fact that CILB 226 implements the GSM-related A interface in a remote manner in FIG. 4B and in a local manner in FIG. 4A is also largely hidden from both BSC SFB 222 and MSC SFB 220 by the configuration-independent interface of CILB 226.

By simply modifying the software codes within CILB 226 and 228, as well as CILB 232 (not shown in FIGS. 4A and 4B), a cellular network created in accordance with the inventive configuration-independent architecture may flexibly be reconfigured in a modular and configuration-independent manner to obtain different network configurations without requiring substantial changes to the codes of its major SFB's. In fact, it is not necessary for the developers of the SFB's, e.g., the MSC, the BSC, the BTS, or the TRX SFB's, to know the details regarding data routing in a specific network configuration. Since the CILB interfaces remain substantially unchanged from the perspective of the SFB's, these SFB's may be developed independent of any knowledge of network configuration. This inventive aspect presents a major advantage when the cellular network needs to be upgraded, maintained, scaled (up or down) to satisfy the capacity and domain requirements of a particular geographic location.

Figure 5:
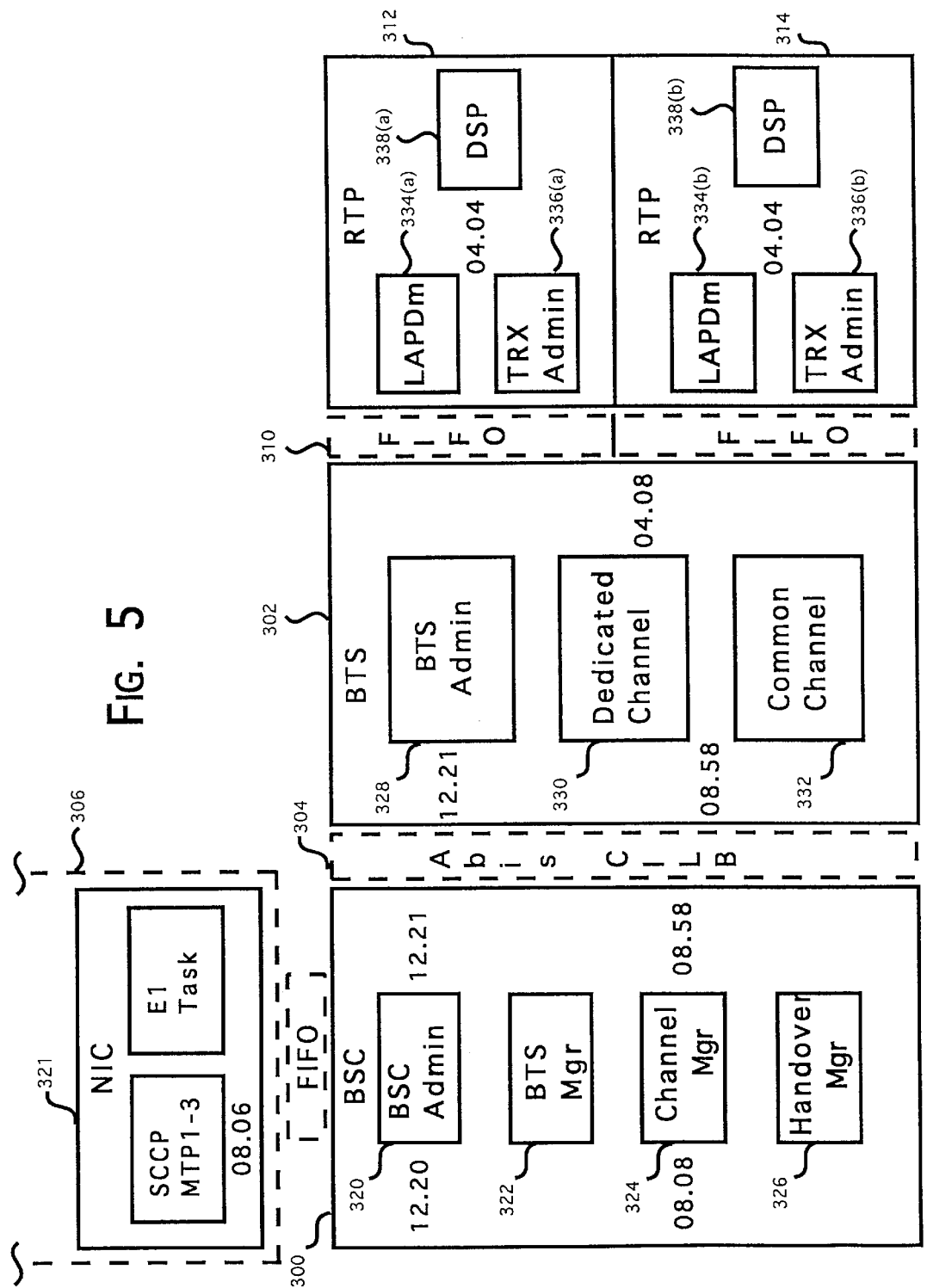
FIG. 5 illustrates a BSS implementation in which a BSC software functional block and a BTS software functional block co-reside in the same CPU/chassis.

FIG. 5 illustrates a BSS implementation in which a BSC SFB and a BTS SFB co-reside in the same CPU/chassis. BSC SFB 300 communicates with BTS SFB 302 through CILB 304. BSC SFB 300 also communicates with a CILB 306 which handles communication between BSC SFB 300 and an MSC (not shown).

Within BSC SFB 300, there are shown, for illustration purposes, some of the functional blocks for implementing the BSC SFB. By way of example, functional blocks BSC administration 320, BTS manager 322, channel manager 324, and handover manager 326 are shown. Similarly, there are shown in BTS SFB 302 BTS administration 328, dedicated channel block 330, and common channel block 332. Each of functional blocks 320-332 may be thought of as a SFB, i.e., they can be remoted or implemented in the same CPU/chassis without requiring substantial changes to their internal codes using the inventive CILB concept.

For illustration purposes, there are shown two radio-dependent SFB's 312 and 314 for facilitating communication between BTS SFB 302 and the cellular handsets (omitted from FIG. 5 for ease of illustration). It should be understood that a greater or fewer number of radio-dependent software function blocks (SFB's) may be provided as necessary to accommodate the number of cellular handsets in a cellular network.

The radio-dependent SFB performs TRX-dependent functions such as communications, LAPDm functions, and TRX administration functions, and the like. For performing the above-mentioned functions, each radio-dependent SFB may include a LAPDm SFB, a TRX administration SFB, and a digital signal processing (DSP) management SFB. BTS SFB 302 communicates with a CILB 310, which handles communication between BTS SFB 302 and a plurality of cellular handsets. Like CILB 232 of FIG. 3, CILB 310 of FIG. 5 appears substantially unchanged to BTS SFB 302 irrespective of the number of radio-dependent SFB's in the cellular network.

Configuration-independent communication may be accomplished in any manner. For illustration purposes, two main communication paradigms for implementing CILB's are discussed herein. Firstly, configuration-independent communication to and from a SFB through a CILB may take place via message passing. In message passing, the sending SFB sends a message to a mailbox having a well-known address. If that destination mailbox is local to the sending SFB, i.e., implemented on the same CPU/chassis, the CILB merely forwards the message to that destination mailbox to be retrieved by the one of the SFB's which monitors the mailbox. If the destination mailbox and its associated receiving SFB is remoted, i.e., implemented on a different CPU/chassis, the CILB will route the message appropriately. From the perspective of the sending SFB, the fact that the destination mailbox is implemented locally in one case and remoted in another case is substantially hidden. The actual details regarding data routing is left to the functions within the CILB.

Alternatively, a CILB may facilitate communication to and from a SFB by calling on interface functions, which are basically library subroutines that can be linked, either statically or dynamically, by the SFB that requires it for communication. By employing the appropriate functions, the CILB can either route data locally or to remote CPU/chassis while keeping such configuration-specific details from both the sending and the receiving SFB's.

An example of a CILB that utilizes interface functions to permit two SFB's of the cellular network to communicate in a configuration-independent manner may be seen in the communication between BTS SFB 302 of FIG. 5 and its radio-dependent SFB's. When BTS SFB 302 wishes to communicate with any of its radio-dependent SFB's, it sends data to CILB 310 which happens to be implemented partially by a first-in-first-out stack (FIFO). Although not a requirement, the FIFO of CILB 310 is implemented, in one embodiment, on the same CPU that executes its associated radio-dependent SFB.

To send data to the FIFO of CILB 310, BTS SFB 302 may call, for example, a subroutine FifoSend, which is a subroutine whose implementation details are hidden from BTS SFB 302. FifoSend is a modular subroutine that handles the routing of data between BTS SFB 302 and the FIFO in CILB 310 in a specific network configuration. Since the implementation details regarding data routing is hidden in the subroutine FifoSend, BTS SFB 302 may be configured as local or remote with respect to the radio-dependent SFB's with which it wishes to communicate simply by modifying the codes inside the subroutine FifoSend. The SFB's themselves and the manner with which they interact with CILB 310 remain substantially unchanged from network configuration to network configuration. This is substantially simpler than modifying the much larger SFB's which implement, for example, the BTS and the radio-dependent blocks whenever network configuration changes, as was required in the prior art Although a FIFO is shown herein for ease of illustration, it should be kept in mind that there exists other methods for interprocessor communication. Examples of these methods include using shared memory, mailboxes, bus protocols (serial, parallel, and other known protocols), and the like.

An example of a CILB which facilitates communication to and from a SFB by message passing may be illustrated with reference to CILB 304. When BTS SFB 302 wishes to communicate with BSC SFB 300, it send messages to a well-known mailbox associated with the Abis interface implemented by codes within CILB 304. If the message passing is done locally, as is the case when both BTS SFB 302 and BSC SFB 300 occupy the same CPU/chassis, functions in CILB 304 are coded to implement local message passing. On the other hand, when BTS SFB 302 is remoted from BSC SFB 300, functions within CILB 304, whose details are hidden from both BTS SFB 302 and BSC SFB 300, utilize facilities such as LAPD to ensure that messages to and from the intended mailbox can be remotely sent or received. Note that from the perspectives of BTS SFB 302 and BSC SFB 300, their interaction with CILB 304 remains substantially unchanged irrespective whether these two SFB's are configured as remote or local in a given network. Further, the interface between CILB 304 and the sending as well as the receiving SFB's, e.g., BTS SFB 302 or BSC SFB 300, remains substantially unchanged irrespective of the number of BTS SFB's 302 that are coupled to BSC SFB 300.

In the specific example of FIG. 5, the MSC (not shown) is implemented on a remote CPU/chassis from that implementing the BTS/BSC SFB's. Consequently, CILB 306 must facilitate remote communication. This remote communication is implemented in FIG. 5 by a remote communication SFB. In the specific example of FIG. 5, this remote communication SFB is implemented using network interface controller (NIC) 321, which includes the A interface (SCCP MTP1-3 as described by GSM standard 08.06) and by the E1 SFB within NIC 321. It should be borne in mind that NIC 321 may also implement the Abis protocol to function as the CILB associated with each of BSC SFB 300 amd BTS SFB 302 when the BTS SFB is remoted from the BSC SFB (via some physical trunk line).

If the MSC had been implemented on the same CPU/chassis that implements the BTS/BSC SFB's of FIG. 5, NIC 321 would not have been necessary and would have been replaced by other functions that facilitate local message passing between BSC SFB 300 and its associated MSC SFB. Note that the interface between CILB 306 and either BSC SFB 300 or its associated MSC SFB remains substantially unchanged regardless whether their respective communication via CILB 306 is local or remote.

It should be kept in mind that the codes that implement BSC SFB 300, BTS SFB 302, and radio-dependent SFB's 312/314 preferably remain substantially unchanged regardless of network configuration. When network configuration changes, it is the functions beneath the CILB's that are modified/replaced to properly route data given the changed network configuration.

Further, the codes which implement the functions underlying the CILB, e.g., those that support the A interface, the Abis interface, or implement the real-time processor (RTP), may either co-reside on the same CPU/chassis with their respective BSC/BTS SFB's or may be remoted to their own CPU/chassis as necessary to fit processing, geographic location, or domain requirements of a cellular network.

Figure 6:
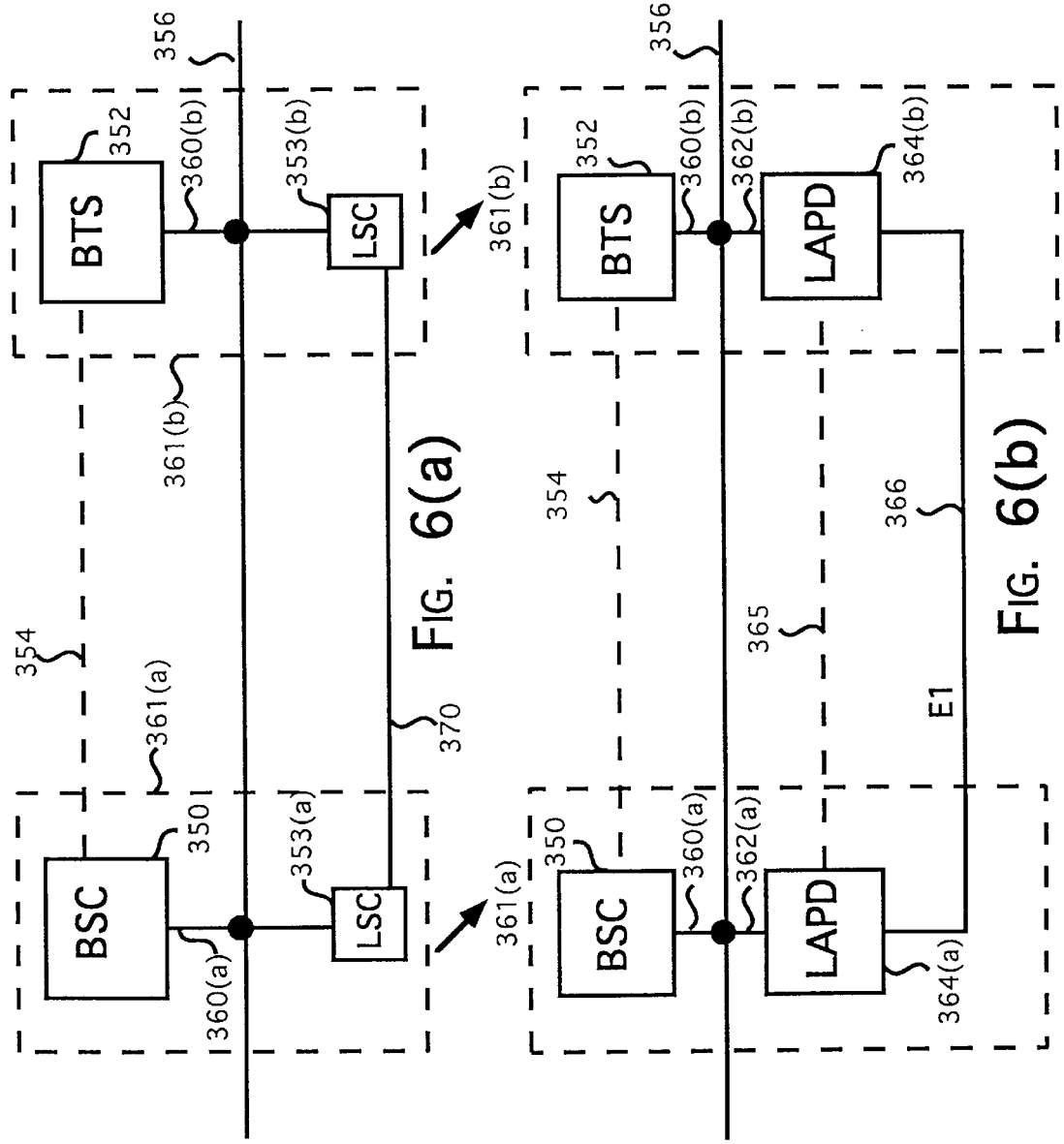
FIG. 6A is a diagram illustrating, in one embodiment, the relationship between the communication protocols between two SFB's such as a BSC SFB and a BTS SFB as well as the actual data exchange that takes place within a configuration-independent linkage block (CILB) between them.
In FIG. 6B, the BSC SFB and the BTS SFB are distributed in different CPU's/chassis.

FIG. 6A is a diagram illustrating the relationship between the communication protocols between two SFB's such as BSC SFB 350 and BTS SFB 352, and the actual data exchange that takes place within a CILB between them. Note that although BTS and BSC SFB's are used in the example, the inventive CILB applies to facilitate communication between any two SFB's regardless of their relative locations in the network.

In FIG. 6A, BSC SFB 350 communicates with BTS SFB 352 using the Abis protocol, which is shown diagramatically in FIG. 6A as dotted line 354. Since BTS SFB 352 and BSC SFB 350 co-reside in the same CPU/chassis in the example of FIG. 6A, data communication between these two SFB's is achieved by local software functional block (SFB) communication (herein "LSC") using primitives implemented by the CILB beneath interface line 356. This communication is shown representatively in FIG. 6A by line 370.

As the term is used herein, local SFB communication (LSC) refers to the communication between SFB's in the same CPU/chassis. Basic functionalities of a LSC consist of, among others, passing a unit of information known as a message between two SFB's. Note that this is the case irrespective whether the SFB's reside in the same task, as separate tasks within the same CPU, as tasks within separate CPU's across a bus, or as tasks on separate CPU's connected in a local area network. LSC may take advantage of message passing facilities of the underlying operating system (OS) that operates the CPU on which the LSC executes. Examples of such OS's are Unix, VxWorks, and VTRX.

Some SFB's may require connection-oriented services. Connection-oriented services. also known in certain context as virtual circuit services, allow communicating SFB's to establish a session during which messages associated with that session may be passed among the communicating SFB's. To enable this feature, LSC supports, among others, the establishment and termination of sessions as well as the association of messages with a session. One implementation of the primitives for implementing the A interface between the LSC's and its respective SFB's are shown, for illustration purposes, in Appendix C. It will be apparent to those skilled in the art that these primitives, which are known in the industry, vary according to the specific interface implemented (e.g., A, ISDN, or the like).

By way of example, FIG. 6A shows LSC facilities 353(*a*) and 353(*b*), which facilitates communication via line 370. Note that since the SFB's of FIG. 6A co-reside in the same CPU/chassis, no trunk resources are necessary. Interface line 356 delineates the configuration-independent portion of the CILB, i.e., that portion above interface line 356 which interacts with the SFB's in a consistent manner irrespective of network configuration, and the implementation details within the CILB below interface line 356. Those implementation details may be modified to ensure proper data routing between the SFB's in a specific network configuration.

In FIG. 6B, BSC SFB 350 and BTS SFB 352 are distributed in different CPU's/chassis. Communication between these two SFB's still preferably utilizes the Abis protocol (dotted line 354). However, the primitives below CILB line 356 change to facilitate remote communication. For ease of understanding, primitives may be thought of as functions that facilitate communication vertically up and down the stacks. A protocol is defined by the message structure (syntax), semantics, and message flows, and are represented as horizontal lines in FIG. 6A and FIG. 6B. A protocol stack may be thought of as a layering of applications such that each application layer performs a well defined function in the context of the overall communication subsystem. It operates according to a defined protocol by exchanging messages, both user data and additional control information, with a corresponding peer layer in a remote system. Each layer has a well defined interface between itself and the layer immediately above and below. Consequently, the implementation of a particular protocol layer is independent of all other layers. The communication between a layer and the layer immediately above and below is accomplished via primitives.

In the example of FIG. 6B, the primitives implementing the Abis stacks 361(*a*) and 361(*b*) at layer two utilizes LAPD. As shown, LAPD blocks 364A and 364B are implemented as layer two and E1 facilities are implemented as layer one. In contrast, message passing is the preferred communication paradigm for local communication in the configuration of FIG. 6A. Note that the primitives 360A and 360B above interface line 356 remain substantially unchanged in both FIGS. 6A and 6B. Only the primitives below interface line 356 change responsive to changes in network configuration to ensure proper data routing. In this manner, the details regarding the actual data routing is hidden from the receiving and sending SFB's. Such data hiding makes the SFB's modular, thereby simplifying the job of developers of these major SFB's.

FIG. 7 is a diagram illustrating, in one embodiment, a message passing paradigm for facilitating communication between SFB's in a configuration-independent manner. Referring now to FIG. 7, there are shown three SFB's 400, 402, and 404. Each of SFB's 400, 402, and 404 may be instantiated from a single task that is intended for accomplishing a certain function, e.g., a block of codes for implementing a BTS. For example, when there are multiple BTS's in a network, multiple instantiations of the BTS task are necessary to implement the software in all the BTS's. Although not particularly relevant to the discussion regarding FIG. 7, it should be noted that software functional blocks of codes 400, 402, and 404 may also represent instantiations of different task-implementing blocks of code.

In one embodiment, there is associated with each task a mailbox whose address is well-known to all the SFB's that need to communicate with instantiations of that task. As the term is used herein, a mailbox represents a section of memory to which messages may be posted for forwarding or retrieval. In this embodiment, all the SFB's that instantiate from a given task are associated with the one mailbox with which the task is associated. In another embodiment, however, each SFB may have associated with it its own mailbox. Note that a mailbox is necessary for receiving messages. If a SFB only sends messages, a mailbox is not absolutely necessary.

To communicate among the SFB's of FIG. 7, the sending SFB needs to know the identity of the mailbox associated with the task from which the receiving SFB instantiates in order to post a message, a request, or data in general to the receiving SFB. Note that the sending SFB does not need to know the name or the specific location in the network of the receiving SFB. This is the case even though the SFB is the entity that is executed, and there may exist more than one SFB's associated with a mailbox.

By way of example, a BTS administration SFB (328) of FIG. 5 may post a message to a particular BTS manager SFB 322 (also of FIG. 5) by sending the message to the mailbox associated with the BTS manager task. The destination BTS manager SFB 322, which has been monitoring this mailbox, may then pick up the posted message from the mailbox. Depending on the nature and content of the message, the destination BTS manager SFB 322 then may either forward the message to another mailbox or reply with another message by posting it to the mailbox associated with the BTS administration task. The pseudocodes for sending as well as retrieving and processing of messages are shown in FIG. 7.

Figure 8:
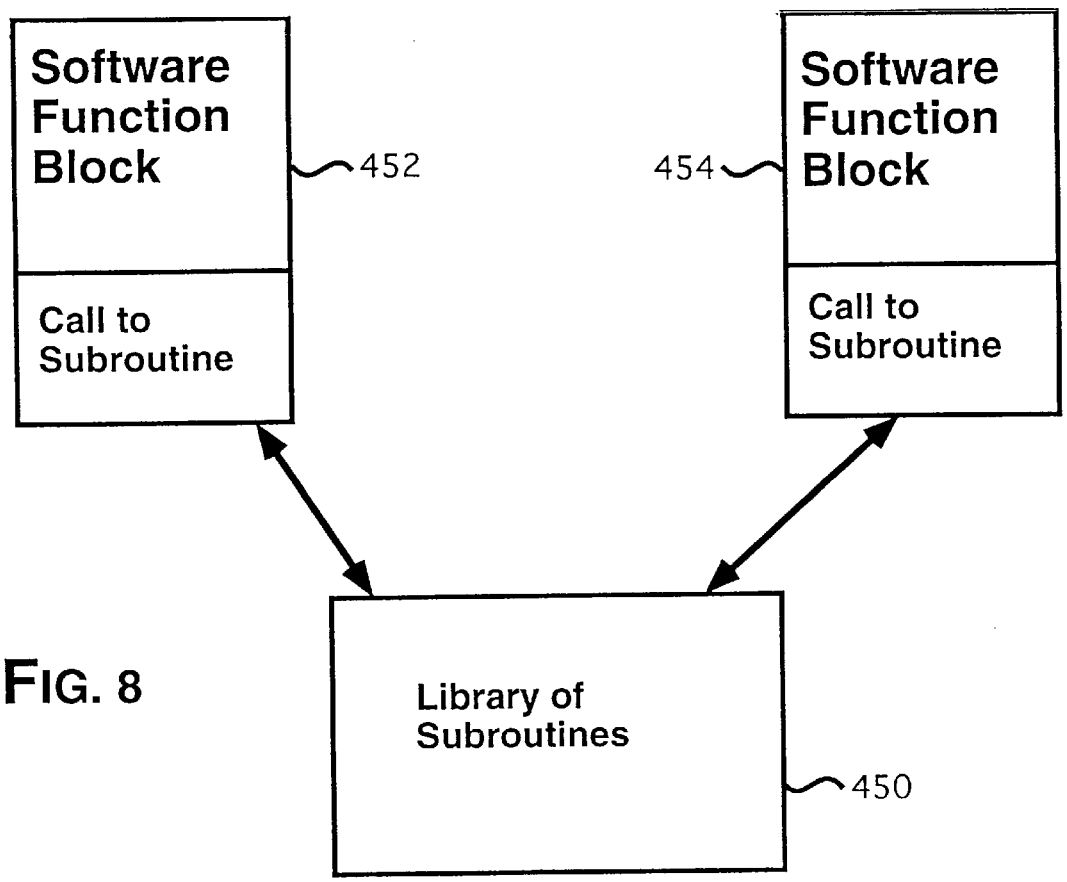
FIG. 8 illustrates how multiple SFB's may utilize subroutines in a library of subroutines to communicate in a configuration independent manner.

At layer 1, the CILB may also be implemented via an interface function paradigm. FIG. 8 illustrates how multiple SFB's may utilize subroutines in a library of subroutines 450 to communicate in a configuration independent manner. In accordance with the interface function paradigm, SFB's 452 and 454 can make calls to library of subroutines 450 to link, either dynamically or at linking time, the subroutines therein that those SFB's need to communicate among each other. Examples of function calls to the library of subroutine 450 include calls to subroutines for sending messages, receiving messages, timing management, network management interfaces, and the like. Note that each subroutine may be utilized by multiple SFB's. For example, a subroutine that reads or writes to files may be utilized by every SFB's that interacts with the disc drive.

To facilitate configuration-independent communication, the manner in which these subroutines are called preferably remain substantially unchanged regardless of network configuration. Further, the implementation details of how data is routed are preferably hidden in the subroutines from both the sending and the receiving SFB's. That way, the subroutines can be utilized by, for example, application developers without requiring any knowledge of its underlying data routing details and without having to take into account network configuration. When network configuration changes, neither the sending or the receiving SFB's, or the manner in which they communicate with the subroutines, need to be substantially changed. Only the data routing details, which are hidden in the subroutines from both the sending and the receiving SFB's, need to be modified to ensure proper data routing when network configuration changes. As is apparent, this inventive aspect advantageously simplifies upgrade, maintenance, and network expansion since the major SFB's are left essentially substantially unchanged.

FIG. 9A shows a multiple-layer communication stack for communicating among SFB's. Above an interface line 500, the two SFB's (BSC SFB 490 and BTS SFB 492) communicate using application layer protocol, shown representatively by dotted line 494. Protocols are defined by the message structure (syntax), semantics, and message flows for communicating across the stacks in FIG. 9A. Note that dotted line 494 does not represent the actual data communication path between BSC SFB 490 and BTS SFB 492. Instead, these SFB's call on primitives, which are functions for communicating down the stacks. The primitives utilize resources in the layers below interface line 500 of the CILB to facilitate communication between the SFB's.

Data routing beneath interface line 500 of the CILB is implemented by a multiple layer stack comprising a LAPD layer (shown representatively by dotted line 496), which facilitates communication between LAPD SFB's 502(a) and 502(b). The primitives above interface line 500 comprise the CILB and preferably remain substantially unchanged irrespective of how the primitives below this interface line 500 handle data routing in a specific network configuration.

In the specific example of FIG. 9A, LAPD SFB's 502(a) and 502(b) further employ primitives to communicate down the stack to layer one SFB's 504(a) and 504(b), which actually transmit and receive the data on a transmission medium. Interface line 501 represents the delineation between the LAPD layer and the physical layer, which happens to be E1 in the example of FIG. 9A. In the example of FIG. 9A, data routing beneath interface line 501 includes an E1 layer (shown by line 503), which facilitates communication between E1 SFB's. If T1 had been used as the physical layer, communication between the SFB's above interface line 501 would preferably remain substantially unchanged. Only the data routing details beneath interface line 501 need to change below interface line 501 when T1 is used instead of E1. As is apparent, there may exist within one stack well-defined interfaces between a higher layer and the next lower layer to improve modularity and to simplify implementation and changes (for example, between BTS SFB 492 and LAPD SFB 502(b) or between LAPD SFB 502(b) and layer one SFB 504(b)).

Note that the communication between primitives themselves may be accomplished via either the aforementioned message passing paradigm or the interface function paradigm. By way of example, the communication in FIG. 9(a) between LAPD SFB 502(a) and layer one SFB 504(a) (as well as between LAPD SFB 502(b) and layer one SFB 504(b)) utilizes the interface function paradigm for their communication. On the other hand, the communication between BSC SFB 490 and LAPD SFB 502(a) (and likewise between BTS SFB 492 and LAPD SFB 502(b)) is implemented using message passing.

By way of example, FIG. 9B shows the communication, using the inventive configuration independent architecture technique, between a BSC SFB and an MSC SFB.

Figure 10:
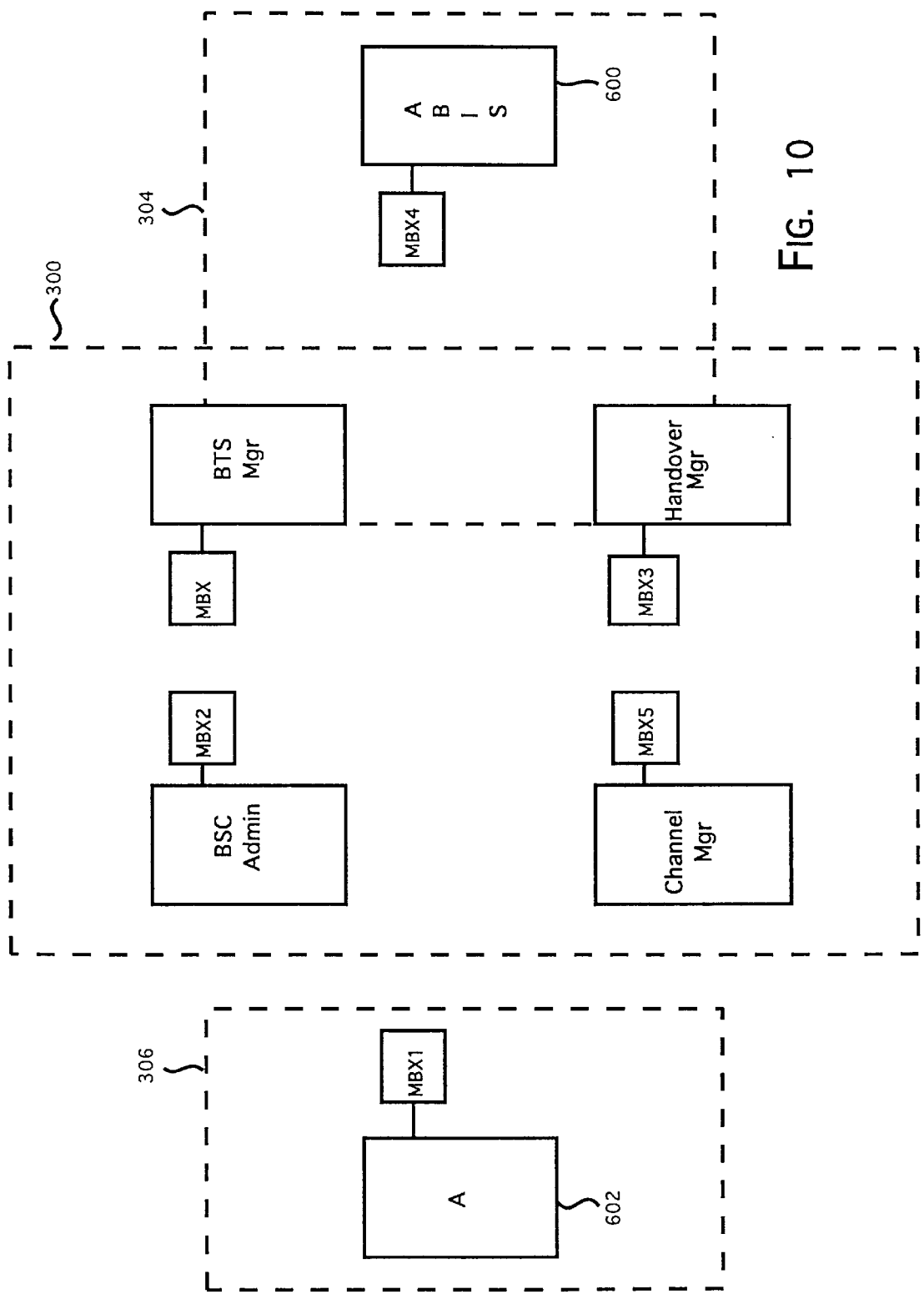
FIG. 10 illustrates the message passing paradigm for communicating among different SFB's.

FIG. 10 illustrates the message passing paradigm for communicating among different SFB's. In FIG. 10, the BSC SFB 300 of FIG. 5 is used as an example although it should be kept in mind that the message passing paradigm may be utilized to facilitate configuration-independent communication among any SFB that is capable of communicating by posting messages. By way of example, communication among the BTS SFB, the MSC SFB, the radio-dependent SFB's, and the remote communication SFB's may also be implemented by message passing.

FIG. 10 shows BSC SFB 300, CILB 306 (which implements the A interface), and CILB 304 (which implements the Abis interface). Inside BSC SFB 300, there are further shown a BSC administration SFB, a BTS manager SFB, a channel manager SFB, and a handover manager SFB. BSC administration SFB implements the operation, administration, and management (OA&M) functions while BTS manager SFB handles BTS dependent functions within the BSC, such as configuring the individual BTS's. The channel manager SFB handles, among other functions, the allocation of radio channels within the BTS's. Handover manager SFB maintains performance statistics of individual radio frequencies, time slots in a BTS for the purpose of handover preparation and execution. Each of the aforementioned SFB's is associated with a mailbox having a well-known address to which messages from other SFB's may be posted.

There is shown inside CILB 304 an Abis interface SPB 600 for implementing the details necessary to route data using the Abis protocol. Abis SFB 600 is associated with a mailbox MBX4 whose address is also well-known. Likewise, CILB block 306 includes an A-interface SFB 602 for implementing the details necessary to route data using the A interface. A-interface SFB 602 is associated with a mailbox MBX1 having a well-known address to which messages from other SFB's, e.g., SFB's inside BSC SFB 300 may be posted. As is mentioned earlier, the mailbox associated with a SFB may either be specifically associated with the SFB itself or be associated with the task underlying the SFB, and all SFB's which instantiate from that task are associated with the same mailbox.

In one embodiment, there is provided a routing table associated with each CPU. The routing table furnishes information to facilitate data routing in a particular network configuration. The data routing information may then be used by the configuration-specific CILB codes to correctly forward messages received from the sending software function block. In one embodiment, if a message needs to be posted to mailbox associated with a SFB that is remoted from the sending SFB or to multiple SFB's, the manner in which the sending SFB sends its message preferably remains substantially unchanged across different network configurations. In particular, it is preferable that the manner in which the sending SFB addresses its messages remains substantially unchanged.

However, when that message is sent from the sending SFB, codes in the CILB cause the CPU to first consult a routing table to determine whether it is necessary to route the message to a mailbox associated with an intermediate handler routine. The intermediate handler routine, which is coded for a particular network configuration and whose data routing details are hidden from both the sending and receiving SFB's, is then responsible for forwarding that message to the appropriate destination mailbox in the network.

Figure 11:
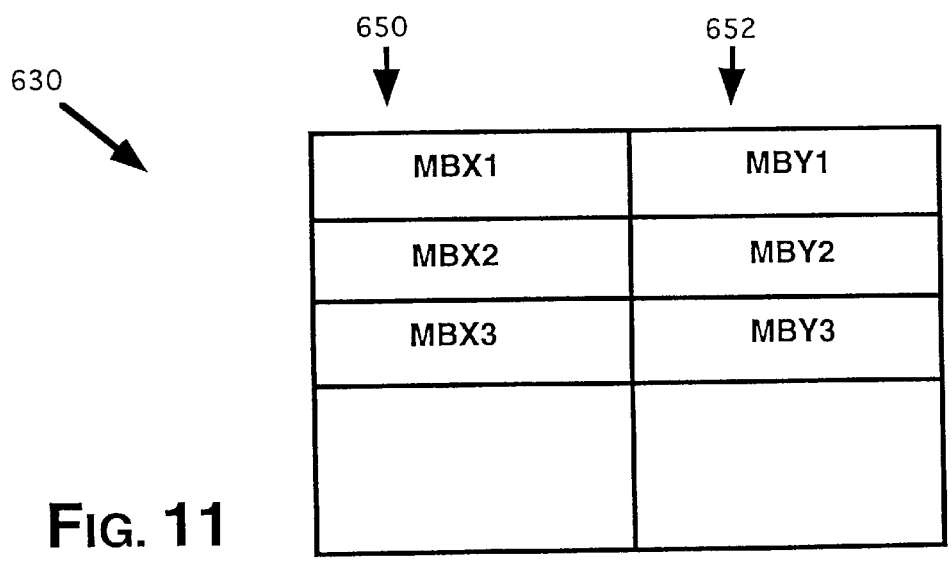
FIG. 11 shows an example of a routing table associated with a CPU.

To illustrate, FIG. 11 shows an example of a routing table 630 associated with a CPU in which there are two columns, 650 and 652. Column 650 shows the identity of the mailbox to which a sending SFB desires to post a message. Column 652 shows a corresponding identity of a mailbox associated with an intermediate handler routine to which the message must first be posted.

By way of example, if a sending SFB wishes to post a message to mailbox MBX1, codes in the CILB causes the CPU handling the posting of that message to first consult with routing table 630 to determine whether this message should first be routed to a mailbox associated with an intermediate handler routine. According to table 630, messages to mailbox MBX1 should first be routed to mailbox MBY1. The intermediate handler routine associated with mailbox MBY1 will then route the message according to its knowledge of the specific network configuration. The use of intermediate handler routines is explored in greater details in FIGS. 12 and 13.

Note that the use of routing tables and intermediate handler routines advantageously hides the configuration-specific data routing details from both the sending and the receiving SFB's. From the perspective of the sending SFB, all it needs to do is post a message to destination mailbox, e.g., mailbox MBX1. Knowledge regarding whether the SFB associated with that mailbox MBX1 is remote or local with respect to the sending SFB and how that message should be routed in a given network configuration is hidden by the use of routing table 630 and intermediate handler functions associated with mailbox MBY1.

In one embodiment, if both the sending SFB and the receiving SFB co-reside on the same CPU/chassis, there is preferably no entry in the routing table. If an entry for the receiving mailbox is absent in the routing table, it is then assumed that the message routing should be local and no intermediate handler function needs to be invoked. In another embodiment, all mailboxes are listed in routing table 630 for consistency. For example, those remoted from the sending SFB may have corresponding intermediate handler mailboxes while those local to the sending SFB have, as corresponding mailboxes, their own mailbox ID's. Other methods of routing may be utilized in place of routing table 630. For example, routing based on spanning tree or using the Dykstra algorithm has been contemplated as suitable alternatives.

Figure 12:
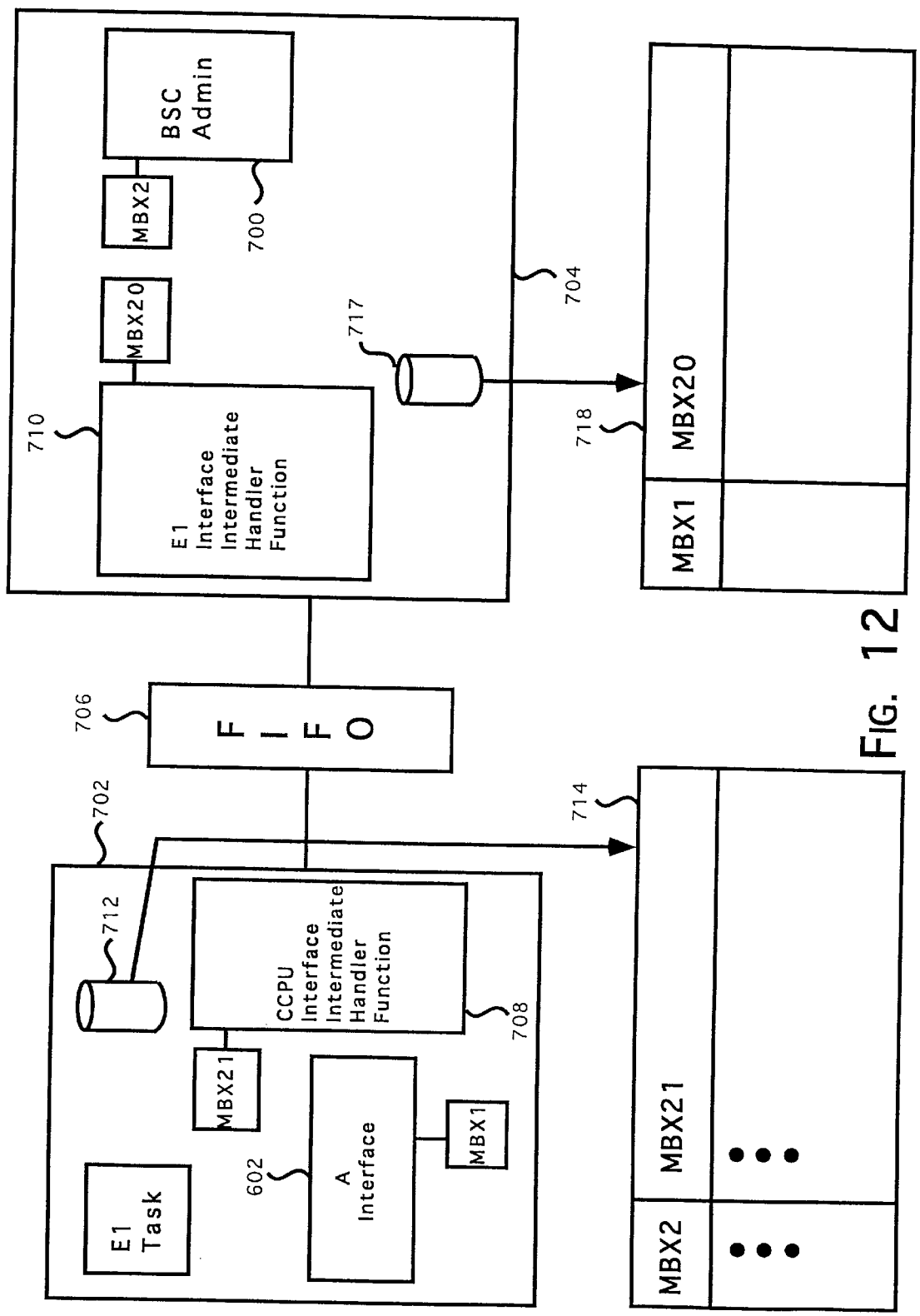
FIG. 12 illustrates the communication between a BSC administration SFB and an A-interface SFB when these two SFB's are remoted from one another.

FIG. 12 illustrates the communication between the BSC administration SFB 700 and A-interface SFB 602 when these two SFB's are remoted from one another. As shown in FIG. 12, A-interface SFB 602 is implemented on an E1 card 702 separate from CCPU card 704. For further information regarding CCPU cards, reference may be made to the aforementioned co-pending patent application Ser. Nos. 08/435,709, 08/434,554, 08/434,598, and 08/434,597. The coupling between CCPU card 704 and E1 card 702, which is facilitated by a first-in first-out (FIFO) block 706. Although not absolutely required, FIFO block 706 is preferably implemented on E1 card 702 itself In the embodiment of FIG. 12, there are shown intermediate handler function blocks 708 and 710 for facilitating remote communication across FIFO 706. Intermediate handler function block 708 handles the communication with CCPU card 704 while intermediate handler function block 710 facilitates communication with E1 card 702. When A-interface SFB 602 wishes to post a message to BSC administration software function block 700, it sends a message to the mailbox associated with the BSC administration software function block 700, i.e., to mailbox MBX2. Before the message is routed to mailbox MBX2, the CPU on E1 card 702 first consults a routing table 714 to determine whether the message should first be posted to a mailbox associated with an intermediate handler function (as would be the case if the destination SFB is remoted or if there are multiple instantiations of the same task).

Routing table 714 is typically stored in the persistent storage on the chassis, such as a hard disk, flash memory, and the like (shown by element 712 in FIG. 12). A sample routing table is shown as table 714 in FIG. 12. Routing table 714 indicates that messages posted to a mailbox MBX2 should first be posted to mailbox MBX 21 which, as shown in FIG. 12, is associated with intermediate handler function block 708. Therefore, the message will first be routed to mailbox MBX21. The message sent to mailbox MBX21 preferably includes information regarding the final destination for the message, i.e., the identity of mailbox MBX2.

Intermediate handler function block 708, which monitors the address associated with mailbox MBX21, then retrieves the message from mailbox MBX21 and forwards it to FIFO 706 to be subsequently retrieved by intermediate handler function 710. Using the destination mailbox MBX2 in the message retrieved, intermediate handler function 710 then consults a routing table 718 to determine how to best route the message it has just retrieved from FIFO block 706. Routing table 718 is preferably kept in the persistent storage facility on CCPU card 704 (shown as element 717).

Since mailbox MBX2 resides on CCPU card 704, no entry is required in routing table 718. Consequently, a consultation with routing table 718 by intermediate handler block 710 will reveal no corresponding mailbox to which the message retrieved from FIFO block 706 should be forwarded. Intermediate handler function block 710 forwards the message it retrieves from FIFO block 706 directly to mailbox MBX2 in the same CPU/chassis using local data routing to be retrieved by BSC administration SFB 700.

In the reverse direction, BSC administration SFB 700 may send a message to mailbox MBX1 associated with A-interface SFB 602 by first consulting routing table 718, which directs the message to be routed to mailbox MBX20. That message is then picked up by intermediate handler function 710 and forwarded to FIFO 706 to be retrieved by intermediate handler function 708. Using the destination mailbox MBX1 in the message retrieved, intermediate handler function 708 then consults routing table 714, which reveals that messages posted to mailbox MBX1 is local from the perspective of intermediate handler function 708, causing the message to be forwarded to mailbox MBX1 locally by message passing.

A-interface SFB 602, which monitors the address of mailbox MBX1, then picks up the message. Note that as far as A-interface SFB 602 and BSC administration SFB 700 are concerned, the format of the message sent and the address of the destination mailbox need not be changed to accommodate changes in network configuration. The internal details regarding data routing in a configuration specific manner are handled by the intermediate handler blocks 708 and 710, using their associated routing tables 714 and 718, as well as by FIFO 706.

In FIG. 12, although the BSC administration SFB and A-interface SFB are used to illustrate the inventive configuration-independent architecture, it should be noted that any SFB's that can communicate by message passing may be so implemented.

Figure 13:
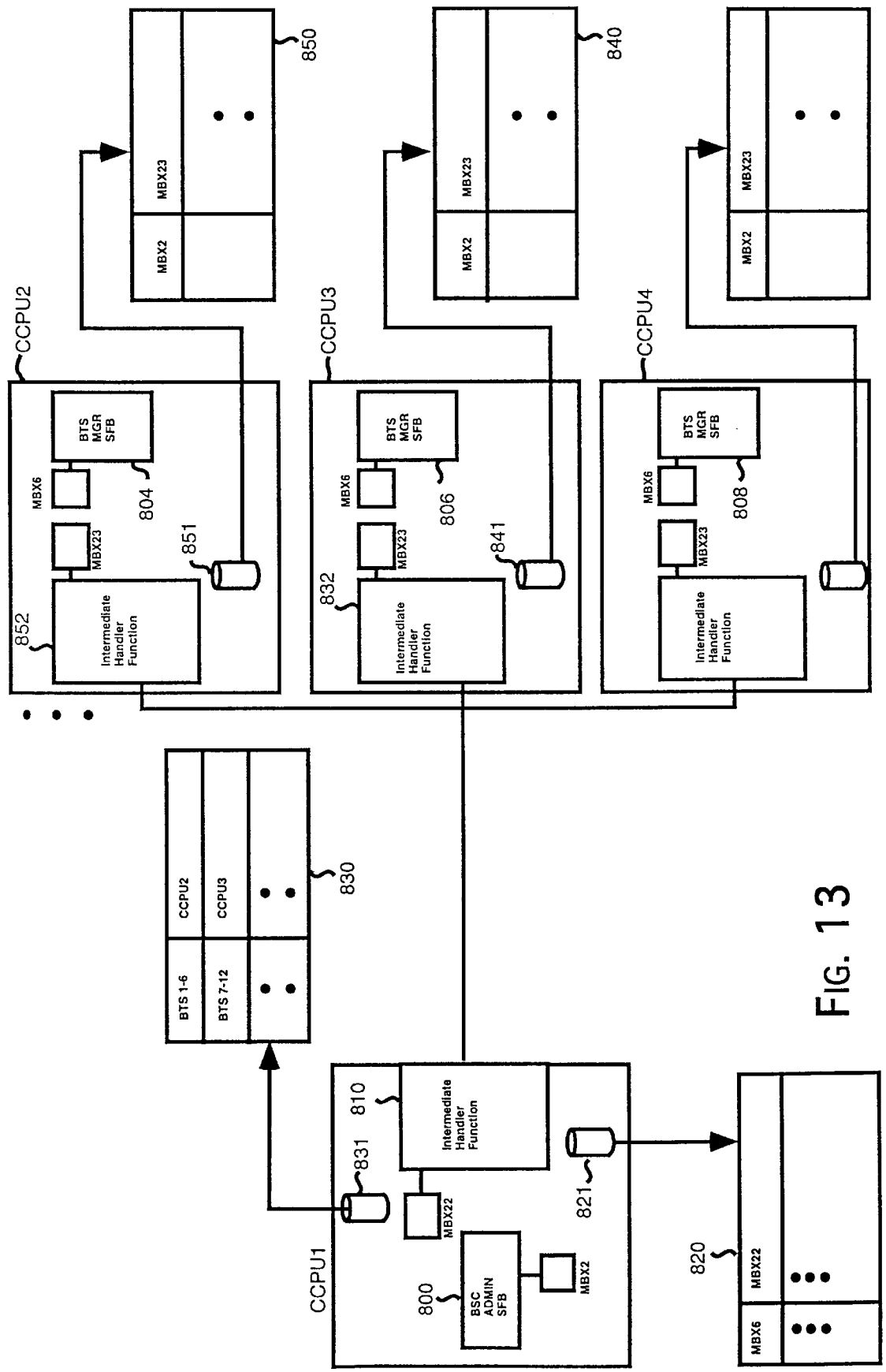
FIG. 13 illustrates the communication between a single BSC administration SFB and three BTS manager SFB's, which are implemented on three discrete cellular central processing unit (CCPU) cards.

FIG. 13 illustrates the communication between a single BSC administration SFB 800 and three BTS manager SFB's 804, 806, and 808, which are implemented on three discrete CCPU cards. Multiple instantiations of the BTS manager task may exist in different CPU's to handle different subsets of BTS's to increase the total number of BTS's that a single BSC can manage. By way of example, BTS manager SFB 804 may handle BTS's 1 through 6, BTS manager SFB 806 may handle BTS's 7 through 12, and BTS manager SFB 808 may handle BTS's 13 through 18. Note that each instantiation of the BTS manager task is typically capable of handling a finite number of BTS's. As system capacity is increased, BTS's are added and additional BTS manager SFB's must be added as well to facilitate scaling. Although three BTS manager SFB's are shown in FIG. 13, a greater or a fewer number may of course be provided depending on network domain and capacity requirements.

Since BTS manager SFB's 804, 806, and 808, being configuration-independent, have no knowledge of each other, they all associate themselves with the same mailbox MBX6. In FIG. 13, BSC administration SFB 800 communicates with all BTS manager SFB's, which may be distributed across multiple CPU's/chassis. It is important, however, that messages from BSC administration SFB 800 get forwarded to the correct instantiation irrespective of network configuration. In the context of the above example, it is important that messages intended for BTS 5 is forwarded to BTS manager SFB 804 (which is implemented on CCPU2) irrespective of where in the network this BTS manager SFB is implemented.

Consider, for example, the communication between BSC administration SFB 800 and BTS manager SFB 806, which controls BTS 8. Since the BTS manager SFB 806 is remote relative to card CCPU1, which implements BSC administration block 800, an intermediate handler function is utilized to handle the configuration-specific data routing details. To illustrate, there is provided with card CCPU1 a BTS manager intermediate handler function block 810. BTS manager intermediate handler function block 810 has associated with it a mailbox MBX22, whose address is known in a routing table 820.

When BSC administration SFB 800 wishes to send a message to BTS manager SFB 806, it merely posts a message to a mailbox associated with the task that instantiates BTS manager SFB 806, i.e., mailbox MBX6. Note that BSC administration SFB 800 does not need to know the data routing details of any specific network configuration to post messages to the well-known address of mailbox MBX6.

The CPU associated with card CCPU1 then consults routing table 820 which reveals that messages posted to mailbox MBX6 should be routed instead to mailbox MBX22, which is associated with BTS manager intermediate handler function block 810. Consequently, the message intended for mailbox MBX6 is forwarded to mailbox MBX22.

BTS manager intermediate handler function block 810, which monitors the address associated with mailbox MBX22, then picks up the message and consults another routing table 830, which reveals that the BTS manager SFB that handles BTS 8 resides on CCPU3. BTS manager intermediate handler function 810 then forwards the message to card CCPU3, or more particularly to CCPU intermediate handler function 832 thereon.

The CPU on CCPU3 then consults a routing table 840 which reveals that mailbox MBX6 is implemented on the same CCPU as intermediate handler function 832. The communication between CCPU intermediate handler function 832 to mailbox MBX6 is therefore local, which may be by message passing in one embodiment. BTS manager SFB 806, which monitors the address associated with mailbox MBX6 then picks up the message.

In the other direction, when a BTS manager SFB 804 wishes to send a message to BSC administration SFB 800, it sends that message to mailbox MBX2, which is associated with the BSC administration task and which has a well-known address. The CPU which runs BTS manager SFB 804 first consults a routing table 850, which reveals that messages intended for mailbox MBX2 should first be routed to a mailbox MBX23, which is associated with CCPU intermediate handler function 852. In one embodiment, routing tables 840 and 850 are substantially similar.

CCPU intermediate handler function 852, which monitors the address of mailbox MBX23, then picks up the message and forwards it to BTS manager intermediate handler function 810. The CPU on CCPU1 card then consults its associated routing table 830, which reveals that mailbox MBX2 (it knows that the message is intended for mailbox MBX2 from the content of the message) is local to CCPU1 card. Therefore, the message is forwarded to mailbox MBX2 on CCPU card in a local manner, which may be message passing in one embodiment for retrieval by BSC administration SFB 800.

Note that the architecture model of FIG. 10 is still enforced regardless whether the BTS manager SFB's are remoted across different CCPU cards as are shown in FIG. 13, are all implemented on a remote CCPU card relative to BSC administration SFB 800, or all co-reside with the BSC administration SFB 800 on the same CPU/chassis. All BSC administration SFB 800 has to do to send messages to a particular BTS manager SFB is to post those messages to the one well-known BTS manager mailbox, i.e., MBX6. The internal details regarding how the data should be routed among the CCPU cards in a specific network configuration are handled by the intermediate handler functions.

When the system configuration changes, it is the intermediate handler function codes that are changed. There is no need for changes in the codes making up either the BSC administration SFB 800, BTS administration SFB's 804, 806, and 808, or the manner in which these SFB's address their messages. Further, the communication between BSC administration SFB 800 and the BTS manager SFB's is consistent from the perspective of the SFB's regardless of network configuration.

Although the foregoing invention has been described in some detail for purposes of clarity of understanding, it will be apparent that certain changes and modifications may be practiced within the scope of the appended claims. By way of example, although the invention is discussed herein with reference primarily to a GSM system, it should be noted that the present invention is not so limiting. It is specifically contemplated that the inventive configuration independent architecture disclosed herein may be implemented in systems using other specific protocols. Consequently, the scope of the invention is not limited to the specific examples given herein but is set forth in the appended claims.

APPENDIX A

GLOSSARY OF TERMS AND ABBREVIATIONS
Abis: Protocol stack between a BTS and a BSC
API: Application Programming Interface
BCF: Base Station Control Function
BSC: Base station Controller
BSS: Base Station Subsystem
BTS: Base Transceiver Station
CC: Call Control Management
CCPU: Cellular CPU
cPBX: cellular Private Branch Exchange
CILB: Configuration Independent Linkage Block
DSP: Digital Signal Processing
GMSC: Gateway for MSC
GSM: Global Systems for Mobile Communication
HLR: Home Location Registry
ISDN: Integrated Services Digital Network
LAPD-M: Link Access Protocol on the Dm (control) channel
LSC: Local Software Functional Block Communication
MM: Mobility Management
MS: Mobile Stations
MSC Mobile-Services Switching Center
PSTN: Public Switched Telephone Network
PBX: Private branch exchange
RF: module Radio Frequency module
RL: Radio Link
RR: Radio Resource Management
SCCP: Signalling Connection Control Part
SFB: Software Functional Block
SMS: Short Message Services
SS: Supplemental Services
TDM data: Time Division Multiplexed Data
TRAU: Transcoder-Rate Adapter Unit
TRX: Transceiver
VLR: Visitor Location Registry
VME: An industry standard bus for interconnecting components
wPBX: wired PBX

APPENDIX B

The present disclosure is written for ease of understanding by those of skill in the art. For others, the following documents, incorporated herein by reference for all purposes, may be reviewed for additional information.

Mouly, Michel & Pautet, Marie-Bernadette, *"The GSM System for Mobile Communications"* Mouly, Michel & Pautet, Marie-Bernadette, 1992.

European Telecommunications Standards Institute, *"European digital cellular telecommunications system (Phase 2); Mobile radio interface signaling layer 3 General aspects (GSM 04.07)"*, 1994, Valbonne-France.

European Telecommunications Standards Institute, *"European digital telecommunications system (Phase 2); Mobile radio interface layer 3 specification (GSM 04.08)"*, 1994, Valbonne-France.

European Telecommunications Standards Institute, *"European digital cellular telecommunications system (Phase 2); Mobile-services Switching Centre-Base Station System (MSC-BBS) interface Layer 3 specification (GSM 08.08)"*, 1994, Valbonne-France.

European Telecommunications Standards Institute, *"European digital cellular telecommunications system (Phase 2); Signaling transport mechanism specification for the Base Station System-Mobile-services Switching Centre (BBS-MSC) interface (GSM 08.06)"*, 1994, Valbonne-France.

European Telecommunications Standards Institute, *"European digital cellular telecommunications system (Phase 2); Base Station Controller-Base Transceiver Station (BSC-BTS) interface Layer 3 specification (GSM 08.58)"*, 1994, Valbonne-France.

European Telecommunications Standards Institute, *"European digital cellular telecommunications system (Phase 2); Mobile Application Part (MAP) specification (GSM 09.02)"*, 1994, Valbonne-France.

European Telecommunications Standards Institute, *"European digital cellular telecommunications system (Phase 2): Signaling requirements on internetworking between the Integrated Services Digital Network (ISDN) or Public Switched Telephone Network (PSTN) and the Public Land Mobile Network (PLMN) (GSM 09.03)"*, 1994, Valbonne-France.

APPENDIX C

```
#ifndef _SS7_IF_H
#define _SS7_IF_H
/*
 * Copyright (c) 1994, 1995

*      interWAVE Communications Inc, Redwood City, CA USA. All rights reserved.
 *
 *      @(#)$Header: /cvs/iw/include/ss7_if.h,v 1.5 1995/09/14 21:01:03 phc Exp $
 *
 * DESCRIPTION: Structure definitions that define the messages that go
 *              between NMI & trillium stack.
 */
externint    ss7_msc_mbx;

#define SS7_SENDMSG(msg) (ss7_msc_mbx == MBX_SS7_IF) ? \
                    E1MsgSend(ss7_slot, MBX_SS7_IF, \
                        MEDIUM_PRIORITY, (tIwMsgHdr*)msg) \
        : \
                    IwMsgSend(ss7_msc_mbx, MEDIUM_PRIORITY, \
                        (tIwMsgHdr*)msg)

#define SS7_NULL_SPID    (0xffff)
#define SS7_NULL_SUID    (0xffff)
#define SS7_NULL_SSN (0xffff)
#define SS7_NULL_PC  (0xffffffff)

#define SS7_SP_CFG_REQ   (1)
#define SS7_SN_CFG_REQ   (2)
#define SS7_SD_CFG_REQ   (3)
#define SS7_QI_CFG_REQ   (4)
#define SS7_PWR_UP   (6)

/* Following messages go from SS7 stack to the IWP */
#define SS7_SP_UDAT_IND   (7)
#define SS7_SP_UI_STA_IND (8)
#define SS7_SP_CORD_IND   (9)
#define SS7_SP_CORD_CFM   (10)
#define SS7_SP_STE_IND    (11)
#define SS7_SP_PC_STE_IND (12)
```

```
#define  SS7_SP_CON_IND      (13)
#define  SS7_SP_CON_CFM      (14)
#define  SS7_SP_DAT_IND      (15)
#define  SS7_SP_EDAT_IND     (16)
#define  SS7_SP_DAT_ACK_IND  (17)
#define  SS7_SP_RST_IND      (18)
#define  SS7_SP_RST_CFM      (19)
#define  SS7_SP_DIS_IND      (20)
#define  SS7_SP_INF_IND      (21)

/* Following message go from IWP to the SS7 stack */
#define  SS7_SP_BND_REQ      (22)
#define  SS7_SP_UBND_REQ     (23)
#define  SS7_SP_UDAT_REQ     (24)
#define  SS7_SP_CORD_REQ     (25)
#define  SS7_SP_CORD_RSP     (26)
#define  SS7_SP_STE_REQ      (27)
#define  SS7_SP_CON_REQ      (28)
#define  SS7_SP_CON_RSP      (29)
#define  SS7_SP_DAT_REQ      (30)
#define  SS7_SP_DAT_ACK_REQ  (31)
#define  SS7_SP_EDAT_REQ     (32)
#define  SS7_SP_RST_REQ      (33)
#define  SS7_SP_RST_RSP      (34)
#define  SS7_SP_DIS_REQ      (35)
#define  SS7_SP_INF_REQ      (36)

#define  SS7_SP_STA_REQ      (37)
#define  SS7_SP_STA_IND      (38)
#define  SS7_SP_STA_CFM      (39)
#define  SS7_SP_STS_REQ      (40)
#define  SS7_SP_STS_CFM      (41)

#define  SS7_SN_STA_REQ      (41)
#define  SS7_SN_STA_IND      (42)
#define  SS7_SN_STA_CFM      (43)
#define  SS7_SN_STS_REQ      (44)
#define  SS7_SN_STS_CFM      (45)

#define  SS7_SD_STA_REQ      (45)
#define  SS7_SD_STA_IND      (46)
#define  SS7_SD_STA_CFM      (47)
#define  SS7_SD_STS_REQ      (48)
#define  SS7_SD_STS_CFM      (49)

#define  SS7_QI_STA_REQ      (50)
#define  SS7_QI_STA_IND      (51)
```

```
#define  SS7_QI_STA_CFM    (52)
#define  SS7_QI_STS_REQ    (53)
#define  SS7_QI_STS_CFM    (54)

#define CP_TRIL_CONID(ss7_con, tril_con)\
         {(ss7_con)->suId = (tril_con)->suId;\
          (ss7_con)->spId = (tril_con)->spId;\
          (ss7_con)->suInstId = (tril_con)->suInstId;\
          (ss7_con)->spInstId = (tril_con)->spInstId;} define CP_SS7_CONID(tril_con, ss7_con)\
         {(tril_con)->suId = (ss7_con)->suId;\
          (tril_con)->spId = (ss7_con)->spId;\
          (tril_con)->suInstId = (ss7_con)->suInstId;\
          (tril_con)->spInstId = (ss7_con)->spInstId;} define CP_SS7_ADDR(tril_adr, ss7_addr)\
         {(tril_adr)->ssn = (ss7_addr)->ssn;\
          (tril_adr)->pc = (ss7_addr)->pc;\
          (tril_adr)->pres = (ss7_addr)->valid;\
          (tril_adr)->sw = SW_CCITT;\
          (tril_adr)->niInd = INAT_IND;\
          (tril_adr)->rtgInd = RTE_SSN;\
          (tril_adr)->ssnInd = (ss7_addr)->valid;\
          (tril_adr)->pcInd = (ss7_addr)->valid;\
          (tril_adr)->gt.format = GTFRMT_0;} define CP_TRIL_ADDR(ss7_adr, tril_addr)\
         {(ss7_adr)->valid = (tril_addr)->pres & (tril_addr)->ssnInd &
\
                             (tril_addr)->pcInd;\
          (ss7_adr)->ssn = (tril_addr)->ssn;\
          (ss7_adr)->pc = (tril_addr)->pc;} ifdef SP
typedef struct {
      tlwMsgHdr  Hdr;
      SpMngmt    mgmt;
} tss7_sp_cfg;
#define SIZE_SS7_SP_CFG    (sizeof(tss7_sp_cfg))

typedef struct {
      tlwMsgHdr  Hdr;
      SpMngmt    sta;
} tss7_sp_sta_req;
#define SIZE_SS7_SP_STA_REQ    (sizeof(tss7_sp_sta_req))
```

```
typedef struct {
    tlwMsgHdr  Hdr;
    SpMngmt         sta;
} tss7_sp_sta_ind;
#define SIZE_SS7_SP_STA_IND    (sizeof(tss7_sp_sta_ind))

typedef struct {
    tlwMsgHdr  Hdr;
    SpMngmt         sta;
} tss7_sp_sta_cfm;
#define SIZE_SS7_SP_STA_CFM    (sizeof(tss7_sp_sta_cfm))

typedef struct {
    tlwMsgHdr  Hdr;
    SpMngmt         sts;
} tss7_sp_sts_req;
#define SIZE_SS7_SP_STS_REQ    (sizeof(tss7_sp_sts_req))

typedef struct {
    tlwMsgHdr  Hdr;
    SpMngmt         sts;
} tss7_sp_sts_cfm;
#define SIZE_SS7_SP_STS_CFM    (sizeof(tss7_sp_sts_cfm))
endif ifdef SN
typedef struct {
    tlwMsgHdr  Hdr;
    SnMngmt         mgmt;
} tss7_sn_cfg;
#define SIZE_SS7_SN_CFG    (sizeof(tss7_sn_cfg))

typedef struct {
    tlwMsgHdr  Hdr;
    SnMngmt         sta;
} tss7_sn_sta_req;
#define SIZE_SS7_SN_STA_REQ    (sizeof(tss7_sn_sta_req))

typedef struct {
    tlwMsgHdr  Hdr;
    SnMngmt         sta;
} tss7_sn_sta_ind;
#define SIZE_SS7_SN_STA_IND    (sizeof(tss7_sn_sta_ind))

typedef struct {
    tlwMsgHdr  Hdr;
    SnMngmt         sta;
```

```
} tss7_sn_sta_cfm;
#define SIZE_SS7_SN_STA_CFM    (sizeof(tss7_sn_sta_cfm))

typedef struct {
    tlwMsgHdr   Hdr;
    SnMngmt     sts;
} tss7_sn_sts_req;
#define SIZE_SS7_SN_STS_REQ    (sizeof(tss7_sn_sts_req))

typedef struct {
    tlwMsgHdr   Hdr;
    SnMngmt     sts;
} tss7_sn_sts_cfm;
#define SIZE_SS7_SN_STS_CFM    (sizeof(tss7_sn_sts_cfm))
endif ifdef SD
typedef struct {
    tlwMsgHdr   Hdr;
    SdMngmt     mgmt;
} tss7_sd_cfg;
#define SIZE_SS7_SD_CFG    (sizeof(tss7_sd_cfg))

typedef struct {
    tlwMsgHdr   Hdr;
    SdMngmt     sta;
} tss7_sd_sta_req;
#define SIZE_SS7_SD_STA_REQ    (sizeof(tss7_sd_sta_req))

typedef struct {
    tlwMsgHdr   Hdr;
    SdMngmt     sta;
} tss7_sd_sta_ind;
#define SIZE_SS7_SD_STA_IND    (sizeof(tss7_sd_sta_ind))

typedef struct {
    tlwMsgHdr   Hdr;
    SdMngmt     sta;
} tss7_sd_sta_cfm;
#define SIZE_SS7_SD_STA_CFM    (sizeof(tss7_sd_sta_cfm))

typedef struct {
    tlwMsgHdr   Hdr;
    SdMngmt     sts;
} tss7_sd_sts_req;
#define SIZE_SS7_SD_STS_REQ    (sizeof(tss7_sd_sts_req))
```

```
typedef struct {
      tIwMsgHdr  Hdr;
      SdMngmt        sts;
} tss7_sd_sts_cfm;
#define SIZE_SS7_SD_STS_CFM     (sizeof(tss7_sd_sts_cfm))
endif ifdef QI
typedef struct {
      tIwMsgHdr  Hdr;
      QiMngmt        mgmt;
} tss7_qi_cfg;
#define SIZE_SS7_QI_CFG     (sizeof(tss7_qi_cfg))

typedef struct {
      tIwMsgHdr  Hdr;
      QiMngmt        sta;
} tss7_qi_sta_req;
#define SIZE_SS7_QI_STA_REQ     (sizeof(tss7_qi_sta_req))

typedef struct {
      tIwMsgHdr  Hdr;
      QiMngmt        sta;
} tss7_qi_sta_ind;
#define SIZE_SS7_QI_STA_IND     (sizeof(tss7_qi_sta_ind))

typedef struct {
      tIwMsgHdr  Hdr;
      QiMngmt        sta;
} tss7_qi_sta_cfm;
#define SIZE_SS7_QI_STA_CFM     (sizeof(tss7_qi_sta_cfm))

typedef struct {
      tIwMsgHdr  Hdr;
      QiMngmt        sts;
} tss7_qi_sts_req;
#define SIZE_SS7_QI_STS_REQ     (sizeof(tss7_qi_sts_req))

typedef struct {
      tIwMsgHdr  Hdr;
      QiMngmt        sts;
} tss7_qi_sts_cfm;
#define SIZE_SS7_QI_STS_CFM     (sizeof(tss7_qi_sts_cfm))
endif typedef struct {
      tIwMsgHdr  Hdr;
```

```c
        u16         suId;
        u16         spId;
        u16         ssn;
        u8          type;
} tss7_sp_bnd_req;
#define SIZE_SS7_SP_BND_REQ (sizeof(tss7_sp_bnd_req))

typedef struct {
        tlwMsgHdr   Hdr;
        u16         spId;
        u16         reason;
} tss7_sp_ubnd_req;
#define SIZE_SS7_SP_UBND_REQ (sizeof(tss7_sp_ubnd_req))

typedef struct {
        tlwMsgHdr   Hdr;
        u16         status;
} tss7_pwr_up;
#define SIZE_SS7_PWR_UP (sizeof(tss7_pwr_up))

typedef struct {
        u16    valid;
        u16    ssn;
        u32    pc;
} tss7_sp_addr;
#define SIZE_SS7_SP_ADDR   (sizeof(tss7_sp_addr))

typedef struct {
        tlwMsgHdr     Hdr;
        u16           SpId;
        tss7_sp_addr  Cd;    /* Called Address */
        tss7_sp_addr  Cg;    /* Calling Address */
        u16           Len;   /* Length of Data Field */
        u8            Data[0];
} tss7_sp_udat_req;
#define SIZE_SS7_SP_UDAT_REQ(len) (sizeof(tss7_sp_udat_req) + len)

typedef struct {
        tlwMsgHdr     Hdr;
        u16           SuId;
        u32           OPc;   /* Originating Point Code */
        tss7_sp_addr  Cd;    /* Called Address */
        tss7_sp_addr  Cg;    /* Calling Addrress */
        u16           Len;   /* Length of Data Field */
        u8            Data[0];
} tss7_sp_udat_ind;
#define SIZE_SS7_SP_UDAT_IND(len) (sizeof(tss7_sp_udat_ind) + len)
```

```
typedef struct {
    u16     suId;
    u16     spId;
    u32     suInstId;
    u32     spInstId;
} tss7_sp_conid;
#define SIZE_SS7_CONID      (sizeof(tss7_conid))

typedef struct {
    tlwMsgHdr   Hdr;
    tss7_sp_conid   ConId;
    tss7_sp_addr    Cd;     /* Called Address */
    tss7_sp_addr    Cg;     /* Calling Addrress */
    u16         Len;
    u8          Data[0];
} tss7_sp_con_req;
#define SIZE_SS7_SP_CON_REQ(len)    (sizeof(tss7_sp_con_req) + len)

typedef struct {
    tlwMsgHdr   Hdr;
    tss7_sp_conid   ConId;
    tss7_sp_addr    Cd;
    tss7_sp_addr    Cg;
    u16         Len;
    u8          Data[0];
} tss7_sp_con_ind;
#define SIZE_SS7_SP_CON_IND(len)    (sizeof(tss7_sp_con_ind) + len)

typedef struct {
    tlwMsgHdr   Hdr;
    tss7_sp_conid   ConId;
    tss7_sp_addr    RspAdr;
    u16         Len;
    u8          Data[0];
} tss7_sp_con_rsp;
#define SIZE_SS7_SP_CON_RSP(len) (sizeof(tss7_sp_con_rsp) + len)

typedef struct {
    tlwMsgHdr   Hdr;
    tss7_sp_conid   ConId;
    tss7_sp_addr    RspAdr;
    u16         Len;
    u8          Data[0];
} tss7_sp_con_cfm;
```

```
#define SIZE_SS7_SP_CON_CFM(len)    (sizeof(tss7_sp_con_cfm) + len)

typedef struct {
    tlwMsgHdr    Hdr;
    tss7_sp_conid    ConId;
    tss7_sp_addr    RspAdr;
    u8    Reason;
    u8    Orig;
    u16    Len;
    u8    Data[0];
} tss7_sp_dis_req;
#define SIZE_SS7_SP_DIS_REQ(len) (sizeof(tss7_sp_dis_req) + len)

typedef struct {
    tlwMsgHdr    Hdr;
    tss7_sp_conid    ConId;
    tss7_sp_addr    RspAdr;
    u8    Reason;
    u8    Orig;
    u16    Len;
    u8    Data[0];
} tss7_sp_dis_ind;
#define SIZE_SS7_SP_DIS_IND(len) (sizeof(tss7_sp_dis_ind) + len)

typedef struct {
    tlwMsgHdr    Hdr;
    tss7_sp_conid    ConId;
    u16    Len;
    u8    Data[0];
} tss7_sp_dat_req;
#define SIZE_SS7_SP_DAT_REQ(len)    (sizeof(tss7_sp_dat_req) + len)

typedef struct {
    tlwMsgHdr    Hdr;
    tss7_sp_conid    ConId;
    u16    Len;
    u8    Data[0];
} tss7_sp_dat_ind;
#define SIZE_SS7_SP_DAT_IND(len) (sizeof(tss7_sp_dat_ind) + len)

extern u32 ss7_slot;    /* Slot of the E1 card that holds the ss7 stack */
extern u16 bssap_spid;
extern u16 bssap_suid;
extern u16 bssap_ssn;
extern u32 them_pc;
```

```
extern u32 us_pc;
extern int ss7_sp_bnd_req(u16 suId, u16 spId, u16 ssn, u8 type);
extern int ss7_sp_ubnd_req(u16 spId, u8 reason);
extern int ss7_sp_udat_req(u16 spId, tss7_sp_addr *cd, tss7_sp_addr *cg,
                u16 len, u8 *data);
extern int ss7_sp_con_req(tss7_sp_conid *conid, tss7_sp_addr *cd,
                tss7_sp_addr *cg, u16 len, u8 *data);
extern int ss7_sp_con_rsp(tss7_sp_conid *conid, tss7_sp_addr *rsp, u16 len,
                u8 *data);
extern int ss7_sp_dat_req(tss7_sp_conid *conid, u16 len, u8 *data);
extern int ss7_sp_dis_req(tss7_sp_conid *conid, tss7_sp_addr *rsp, u8 reason,
                u8 originator, u16 len, u8 *data);
#endif      /* _SS7_IF_H */
```

What is claimed is:

1. A configuration-independent software architecture for implementing a cellular communication network, said cellular communication network facilitating communication among a plurality of cellular handsets, comprising:
   a first software functional block for implementing a first set of functions;
   a second software functional block for implementing a second set of functions; and
   a configuration-independent linkage block having an interface that appears consistent to both said first software functional block and said second software functional block irrespective of a relative position between said second software functional block, said first software functional block, and said configuration-independent linkage block in said cellular communication network, said configuration-independent linkage block facilitating communication between said first software functional block and said second software functional block via said interface utilizing configuration-independent linkage block, wherein said first software functional block, said second software functional block, and said interface remain substantially unchanged when said first software functional block changes its location in the cellular communication network relative to said second software functional block.

2. The network of claim 1 wherein said first software functional block is a base transceiver station software functional block and said first set of functions is a set of base transceiver station functions, said second software functional block is a base station controller software functional block and said second set of functions is a set of base station controller functions.

3. The network of claim 2 wherein said interface comprises primitives for implementing an Abis interface and said configuration-independent linkage block comprises internal functions implementing LAPD functionalities for facilitating remote communication between said base transceiver station software functional block and said base station controller software functional block.

4. The network of claim 3 wherein said base transceiver station software functional block and said base station controller software functional block are executed in two different central processing units, said two different central processing units residing on a common chassis.

5. The network of claim 3 wherein said base transceiver station software functional block and said base station controller software functional block are executed in two different central processing units, said two different central processing units residing on two different chassis.

6. The network of claim 2 wherein said interface comprises primitives for implementing an Abis interface and said configuration-independent linkage block comprises internal functions implementing local software functional block communication for facilitating local communication between said base transceiver station software functional block and said base station controller software functional block.

7. The network of claim 6 wherein said base transceiver station software functional block and said base station controller software functional block are executed using a single central processing unit.

8. A method for facilitating communication among a plurality of software functional blocks in a cellular communication network, said cellular communication network having a plurality of central processing units, said method comprising:

providing a first software functional block for implementing a first set of functions, said first software functional block being executed on a first central processing unit in said cellular communication network;
   providing a second software functional block for implementing a second set of functions, said second software functional block being a first instantiation of a block of codes representing said second set of functions;
   providing a third software functional block for implementing said second set of functions, said third software functional block being a second instantiation of said block of codes representing said second set of functions; and
   facilitating configuration-independent communication between said first software functional block and both said second and third software functional blocks using at least one configuration-independent linkage block, said configuration-independent linkage block having internal functions that transparently implementing, from the perspectives of said first, second, and third software functional blocks, configuration-specific communication among said first, second, and third software functional blocks, said configuration-independent communication takes place via an interface that is substantially consistent irrespective whether said second and third software functional blocks execute on said first central processing unit or on different central processing units in said cellular communication network, wherein said first, second, and third software functional blocks remain substantially unchanged across network configurations.

9. The method of claim 8 wherein said first, second, and third software functional blocks and said interface remain substantially unchanged irrespective whether said second and third software functional blocks are executed on a second central processing unit that is different from said first central processing unit or on two different central processing units that are different from said first central processing unit.

10. The method of claim 9 wherein said first software functional block is a base station controller software functional block and said first set of functions is a set of base station controller functions, said second software functional block is a base transceiver station software functional block and said second set of functions is a set of base transceiver station functions, and said third software functional block is a base transceiver station software functional block implementing said set of base transceiver station functions.

11. The method of claim 10 wherein said first software functional block is implemented on a first chassis and said second and third software functional blocks are implemented on a second chassis in said cellular communication network, said first and second chassis are remoted from one another and coupled together using trunk lines in said cellular communication network.

12. The method of claim 11 wherein said second and third software functional blocks execute on two different central processing units in said second chassis.

13. The method of claim 11 wherein said internal functions in said configuration-independent linkage block implement LAPD facilities for facilitating remote communication between said first software functional block and one of said second and third software functional blocks.

14. The method of claim 9 wherein said first software functional block is implemented on a first chassis, said second software functional block is implemented on a second chassis, and said third software functional block is implemented on a third chassis in said cellular communication network, wherein said first, second, and third chassis are remoted from one another and coupled together using trunk lines in said cellular communication network.

15. The method of claim 14 wherein said internal functions in said configuration-independent linkage block implement LAPD facilities for facilitating remote communication between said first software functional block and one of said second and third software functional blocks.

16. The method of claim 9 wherein said first, second and third software functional blocks are implemented on the same chassis in said cellular communication network, said internal functions in said configuration-independent linkage block implement local software functional block communication for facilitating local communication between said first software functional block and one of said second and third software functional blocks.

17. The method of claim 9 wherein said first software functional block is a mobile station controller software functional block and said first set of functions is a set of mobile station controller functions, said second software functional block is a base station controller software functional block and said second set of functions is a set of base station controller functions, and said third software functional block is a base station controller software functional block implementing said set of base station controller functions.

18. The method of claim 17 wherein said first, second, and third software functional blocks are implemented in a first chassis in said cellular communication network.

19. The method of claim 18 wherein said first software functional block is implemented on a first chassis while said second and third software functional blocks are implemented on chassis different from said first chassis.

20. The method of claim 9 wherein said first software functional block is a base station controller software functional block and said first set of functions is a set of base station controller functions, said second software functional block is a TRX software functional block and said second set of functions is a set of TRX functions, and said third software functional block is a base station controller software functional block implementing said set of TRX functions.

21. The method of claim 20 wherein said first, second, and third software functional blocks are implemented in a first chassis in said cellular communication network.

22. The method of claim 21 wherein said first software functional block is implemented on a first chassis while said second and third software functional blocks are implemented on chassis different from said first chassis.

23. The method of claim 22 wherein said second and third software functional blocks are executed on a different central processing units in said chassis different from said first chassis.

* * * * *